(12) United States Patent
Chan et al.

(10) Patent No.: US 9,269,095 B1
(45) Date of Patent: Feb. 23, 2016

(54) METHODS AND SYSTEMS FOR VISUAL REPLAY OF PREDICTIVE ENGINE PERFORMANCE

(71) Applicant: TappingStone Inc., Walnut, CA (US)

(72) Inventors: Simon Chan, Belmont, CA (US); Ka Hou Chan, Sunnyvale, CA (US)

(73) Assignee: TappingStone Inc., Walnut, CA (US)

( * ) Notice: Subject to any disclaimer, the term of this patent is extended or adjusted under 35 U.S.C. 154(b) by 0 days.

(21) Appl. No.: 14/797,125

(22) Filed: Jul. 11, 2015

Related U.S. Application Data

(63) Continuation of application No. 14/684,418, filed on Apr. 12, 2015, now Pat. No. 9,135,559.

(60) Provisional application No. 62/136,311, filed on Mar. 20, 2015.

(51) Int. Cl.
*G06Q 30/02* (2012.01)
*G06N 99/00* (2010.01)

(52) U.S. Cl.
CPC .......... *G06Q 30/0204* (2013.01); *G06N 99/005* (2013.01)

(58) Field of Classification Search
None
See application file for complete search history.

(56) References Cited

U.S. PATENT DOCUMENTS

| | | |
|---|---|---|
| 7,480,640 B1 | 1/2009 | Elad et al. |
| 2011/0040612 A1 | 2/2011 | Simmons et al. |
| 2012/0284069 A1 | 11/2012 | Kemp |
| 2014/0344193 A1 | 11/2014 | Bilenko et al. |

OTHER PUBLICATIONS

Dato, "Dato—Fast, Scalable Machine Learning Platform," Dato website, available at https://dato.com Accessed on Apr. 12, 2015.
Datarobot Inc., "DataRobot—Better Predictions. Faster," DataRobot website, available at http://www.datarobot.com Accessed on Apr. 12, 2015.
Yhat, "Yhat—Data Science Operations Platform," Yhat website, available at https://yhathq.com/ Accessed on Apr. 12, 2015.
Cloudera, Inc., "The Platform for Big Data and the Leading Solution for Apache Hadoop in the Enterprise—Cloudera," Cloudera website, available at http://www.cloudera.com/content/cloudera/en/home.html Accessed on Apr. 12, 2015.

(Continued)

*Primary Examiner* — Alan Chen
(74) *Attorney, Agent, or Firm* — American Patent Agency PC; Daniar Hussain

(57) ABSTRACT

Disclosed are methods and systems for creating, evaluating, and tuning a predictive engine for machine learning, and for replaying performance of the predictive engine, including steps to deploy a variant of the predictive engine; receive a plurality of queries to the predictive engine variant from an end-user device; apply a query segment filter to the plurality of queries to generate a replay group of queries, wherein for each query in the replay group, the engine variant generates a corresponding predicted result, receives a corresponding actual result, and computes a corresponding prediction score; group queries in the replay group into one or more segments; and generate, as a replay of the performance of the engine variant, an accumulated prediction score over each of the one or more query segments of the replay group by applying an accumulation function. The present invention substantially improves on systems that utilize predictive engines.

30 Claims, 23 Drawing Sheets

(56) References Cited

OTHER PUBLICATIONS

Github, Inc., "cloudera/oryx . GitHub," Cloudera Oryx at GitHub, available at https://github.com/cloudera/oryx Accessed on Apr. 12, 2015.
Skytree, Inc., "Platform—Skytree," Skytree Infinity website, available at http://www.skytree.net/products/skytree-infinity/platform/ Accessed on Apr. 12, 2015.
Simon Chan, Philip Treleaven, and Licia Capra. "Continuous Hyperparameter Optimization for Large-scale Recommender Systems." Proceedings of the IEEE International Conference on Big Data. California, US, Oct. 2013.
Simon Chan, Thomas Stone, Kit Pang Szeto, and Ka Hou Chan. "PredictionIO: A Distributed Machine Learning Server for Practical Software Development." Proceedings of the ACM Conference of Information and Knowledge Management (CIKM). California, US, Oct. 2013.
Masa-Aki Sato, "Online model selection based on the variational bayes," Neural Computation, vol. 13, No. 7, pp. 1649-1681, 2001.
Yucheng Low, Joseph Gonzalez, Aapo Kyrola, Danny Bickson, and Carlos Guestrin. "Graphlab: A distributed framework for machine learning in the cloud." arXiv preprint, arXiv:1107.0922, 2011.
Yucheng Low, Joseph Gonzalez, Aapo Kyrola, Danny Bickson, Carlos E. Guestrin, and Joseph Hellerstein. "Graphlab: A new framework for parallel machine learning." arXiv preprint, arXiv:14082041, 2014.
Yucheng Low, Danny Bickson, Joseph Gonzalez, Carlos Guestrin, Aapo Kyrola, and Joseph Hellerstein. "Distributed GraphLab: A framework for machine learning and data mining in the cloud." Proceedings of the VLDB Endowment 5, No. 8, pp. 716-727, 2012.
Yucheng Low. "GraphLab: A Distributed Abstraction for Large Scale Machine Learning." PhD dissertation, Carnegie Mellon University, Pittsburgh, PA, US, Jun. 2013.
Brent Komer, James Bergstra, and Chris Eliasmith. "Hyperopt-sklearn: Automatic hyperparameter configuration for scikit-learn." Proceedings of the 13th Python in Science Conference (SCIPY), 2014.
Fabian Pedregosa, et al. "Scikit-learn: Machine learning in Python." The Journal of Machine Learning Research 12, pp. 2825-2830, 2011.
Simon Chan, "PredictionIO—A Machine Learning Server in Scala," talk presented in San Francisco, CA, on Feb. 9, 2015. Available at https://www.hakkalabs.co/articles/predictionio-build-deploy-ml-applications-fraction-time.

METHODS AND SYSTEMS FOR VISUAL REPLAY OF PREDICTIVE ENGINE PERFORMANCE

REFERENCE TO RELATED APPLICATIONS

This application claims the benefit of priority from U.S. Ser. No. 14/684,418, filed on Apr. 12, 2015, and entitled "METHODS AND SYSTEMS FOR PREDICTIVE ENGINE EVALUATION, TUNING, AND REPLAY OF ENGINE PERFORMANCE," which issued as U.S. Pat. No. 9,135,559 on Sep. 15, 2015, and also is a non-provisional of and claims the benefit of provisional application having U.S. Ser. No. 62/136,311, filed on Mar. 20, 2015, and entitled "METHODS AND SYSTEMS FOR PREDICTIVE ENGINE EVALUATION AND TUNING," the entire disclosures of both of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention broadly relate to systems and methods for building and deploying machine learning systems for predictive analytics. More particularly, embodiments of the present invention relate to creating, evaluating, tuning predictive engines in production, and replaying the performance of predictive engines for predictive engine design and analysis. A predictive engine includes one or more predictive models that can be trained on collected data for predicting future user behaviors, future events, or other desired information. Such prediction results are useful in various business settings such as in marketing and sales. Embodiments of the present invention enable customization of engine components targeted for specific business needs, allow systematic evaluation and tuning of multiple engines or engine variants, and provide ways of replaying engine performances during or after the evaluation and tuning processes.

BACKGROUND OF THE INVENTION

The statements in this section may serve as a background to help understand the invention and its application and uses, but may not constitute prior art.

Machine learning systems analyze data and establish models to make predictions and decisions. Examples of machine learning tasks include classification, regression and clustering. A predictive engine is a machine learning system that typically includes a data processing framework and one or more algorithms trained and configured based on collections of data. Such predictive engines are deployed to serve prediction results upon request. A simple example is a recommendation engine for suggesting a certain number of products to a customer based on pricing, product availabilities, product similarities, current sales strategy, and other factors. Such recommendations can also be personalized by taking into account user purchase history, browsing history, geographical location, or other user preferences or settings. Some existing tools used for building machine learning systems include APACHE SPARK MLLIB, MAHOUT, SCIKIT-LEARN, and R.

Recently, the advent of big data analytics has sparked more interest in the design of machine learning systems and smart applications. However, even with the wide availability of processing frameworks, algorithm libraries, and data storage systems, various issues exist in bringing machine learning applications from prototyping into production. In addition to data integration and system scalability, real-time deployment of predictive engines in a possibly distributed environment requires dynamic query responses, live model update with new data, inclusion of business logics, and most importantly, intelligent and possibly live evaluation and tuning of predictive engines to update the underlying predictive models or algorithms to generate new engine variants. In addition, existing tools for building machine learning systems often provide encapsulated solutions. Such encapsulations, while facilitating fast integration into deployment platforms and systems, make it difficult to identify causes for inaccurate prediction results. It is also difficult to extensively track sequences of events that trigger particular prediction results.

Therefore, in view of the aforementioned difficulties, there is an unsolved need to make it easy and efficient for developers and data scientists to create, deploy, evaluate, and tune machine learning systems.

It is against this background that various embodiments of the present invention were developed.

BRIEF SUMMARY OF THE INVENTION

The inventors of the present invention have created methods and systems for creating, deploying, evaluating, and tuning predictive engines for machine learning applications, and for replaying the performances of such predictive engines.

More specifically, in one aspect, one embodiment of the present invention is a method for replaying the performance of a predictive engine, the method including steps to deploy a variant of the predictive engine, based on an engine parameter set, wherein the engine parameter set specifies a plurality of algorithms utilized by the engine variant, a plurality of algorithm parameters, and/or other information to specify the engine variant, its components, and the components' parameters; the deployed engine variant listens to and receives queries from an end-user device, wherein each of the received query contains a timestamp. The method further includes steps to apply a query segment filter to received queries to generate a replay group; for each query in the replay group, the engine variant generates a corresponding predicted result, receives a corresponding actual result (which could be a variety of actual events, user actions, and/or subsequent user behaviors, at any time in the future), and computes a corresponding prediction score based on the predicted result and the actual result. The method further includes steps to group queries in the replay group into one or more segments, according to timestamps associated with each query, and to generate an accumulated prediction score over each query segment of the replay group by applying an accumulation function. The accumulated prediction scores are a replay of the performance of the engine variant. In some embodiments, the replay of the engine performance comprises a graphical display of the accumulated prediction scores.

In some embodiments of the present invention, the query segment filter is an engine variant filter, a user attribute filter, an item attribute filter, or a query attribute filter. In some embodiments, the query segment filter is determined manually by an operator. In some embodiments, the accumulation function is a weighted summation.

In some embodiments of the present invention, the engine parameter set is generated manually by the operator. In other embodiments, the engine parameter set is determined automatically by the system using one or more heuristics, rules, or other procedures. In yet other embodiments, the engine parameter set may be determined automatically, and later edited or modified by the operator before the engine variant is deployed.

In some embodiments, the actual results comprise a sequence of user responses to the predicted results. In other embodiments, the actual results are received from a datastore. In other embodiments, the actual results are simulated. In yet other embodiments, the actual results are correct values, actual events, user actions and/or subsequent end-user behaviors, depending on the uses of the predictive engine.

In some embodiments, the method for replaying the performance of the predictive engine further comprises steps to apply another query segment filter to the received queries to generate another replay group. For each query in the replay group, the engine variant generates a corresponding predicted result, receives a corresponding actual result, and computes a corresponding prediction score based on the corresponding predicted result and actual result. In addition, the method groups queries in the second replay group into one or more segments according to timestamps associated with the queries, and generates accumulated prediction scores over each of the query segments of the second replay group by applying the accumulation function.

In another aspect, the present invention is a non-transitory, computer-readable storage medium storing executable instructions, which when executed by a processor, causes the processor to perform a process for replaying the performance of a predictive engine in a client-server environment, the instructions causing the processor to perform the aforementioned steps.

In another aspect, the present invention is a system for replaying the performance of a predictive engine, the system comprising a user device having a processor, a display, and a first memory; a server comprising a second memory and a data repository; a telecommunications-link between said user device and said server; and a plurality of computer codes embodied on said memory of said user-device and said server, said plurality of computer codes which when executed causes said server and said user-device to execute a process comprising the aforementioned steps.

In yet another aspect, the present invention is a computerized server comprising at least one processor, memory, and a plurality of computer codes embodied on said memory, said plurality of computer codes which when executed causes said processor to execute a process comprising the aforementioned steps.

Yet other aspects of the present invention include the methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Definitions

Figure 1:
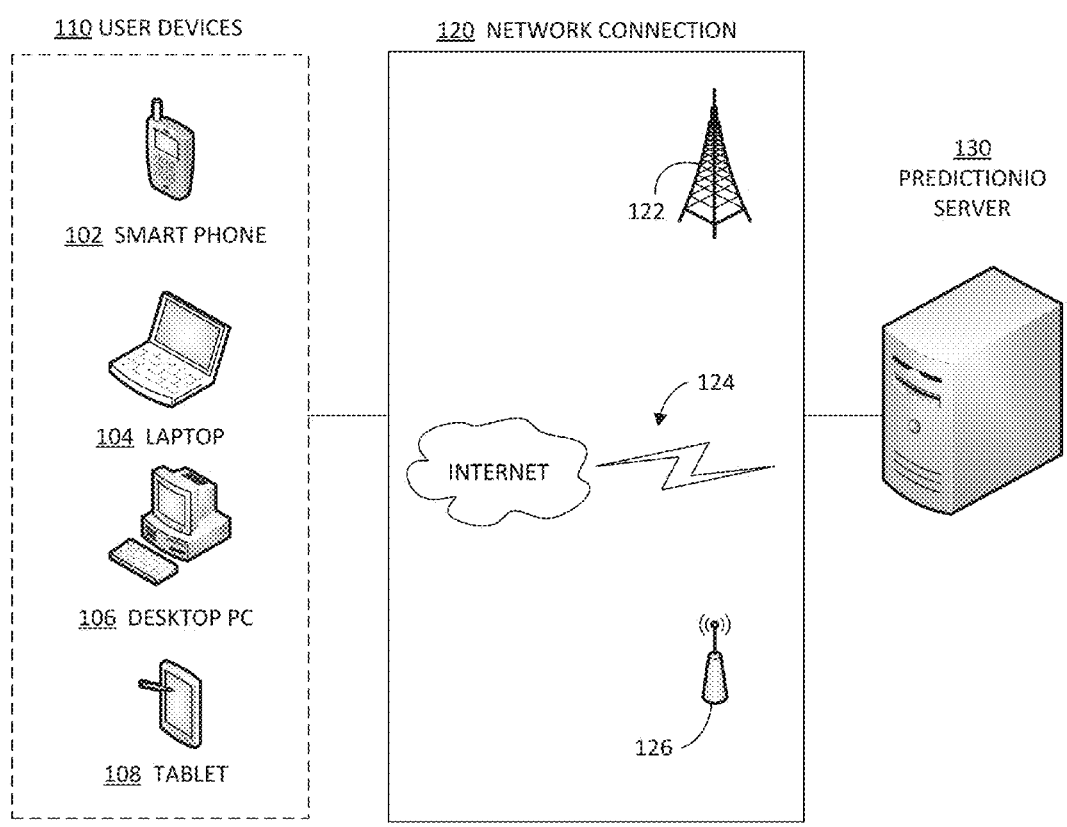
FIG. 1 is a network configuration diagram in which the present invention may be practiced.

Some illustrative definitions are provided to assist in understanding the present invention, but these definitions are not to be read as restricting the scope of the present invention. The terms may be used in the form of nouns, verbs or adjectives, within the scope of the definitions.

"Prediction engine" and "predictive engine" refer to program code components that are used to make predictions, for example, of how a user might behave given certain inputs. The terms "prediction" and "predictive" are used interchangeably in this description.

"Data source" refers to a component of a predictive engine for reading data from one or more source(s) of data storage, wherein the data could be training data, test data, real data, live data, historical data, simulated data, and so forth.

"Data preparator" refers to a component of a predictive engine for automatic preprocessing of data from any data source, possibly into a desired format. The data preparator prepares and cleanses data according to what the predictive engine expects.

"Algorithm" refers to an algorithmic component of a predictive engine for generating predictions and decisions. The Algorithm component includes machine learning algorithms, as well as settings of algorithm parameters that determine how a predictive model is constructed. A predictive engine may include one or more algorithms, to be used independently or in combination. Parameters of a predictive engine specify which algorithms are used, the algorithm parameters used in each algorithm, and how the results of each algorithm are congregated or combined to arrive at a prediction engine result, also known as an output or prediction.

"Serving" component refers to a component of a predictive engine for returning prediction results, and for adding custom business logic. If an engine has multiple algorithms, the Serving component may combine multiple prediction results into one.

"Evaluator" or "Evaluation" component refers to a component of a predictive engine for evaluating the performance of the prediction process to compare different algorithms as well as different engine variants.

"DASE" is an acronym for Data (including Data source and Data preparator), Algorithm (including algorithm parameters), Serving, and Evaluation components, as defined above. All DASE inputs are customizable.

"Engine variant", "variant", and "predictive engine variant" refer to a deployable instance of a predictive engine, specified by a given engine parameter set. An engine parameter set includes parameters that control each component of a predictive engine, including its Data Source, Data Preparator, Algorithm, Serving, and/or Evaluator components.

"Query" and "Q" is a request from an end-user or end-user device for information. For example, a recommendation for a product, a recommended product and its associated price, or other data to be served to the end-user. A query can be seen as an explicit or implicit request for one or more predictive results.

"Predicted result", "prediction result", and "P" is a prediction made by a prediction engine. For example, a predicted result could be an end-user purchasing a given recommended product.

"Actual result" and "A" includes correct values, actual events, as well as user actions or "subsequent end-user behaviors." Actual results can be correct values to predictive problems such as classifications, actual outcomes or results of future events, and/or any user actions or behaviors from the end-user device specifying what the end-user has done in response to a prediction result provided in response to a query, and so on. Actual results include actual outcomes in the case of a prediction engine predicting actual events. For example, if the a prediction engine is used to predict whether a tree will fall down within 24 hours, the "actual result" will be the correct value of whether that particular tree actually falls down within the predicted time period. In addition, actual results also include any subsequent end-user behaviors, including but not limited to, purchasing the recommended product, clicking on various locations on the end-user device, performing various actions on the end-user application, and so forth. If P=A for a given Q, then it is considered an excellent prediction. The deviation of P from A can be used to define a metric of the accuracy or correctness of a given prediction engine for a given Q.

"End-user" or simply "user" are users of the end-user application that is being implemented and tested using the prediction engine. In one embodiment, the end-users are consumers who utilize a consumer application that is employing a prediction engine to serve recommendations to the end-user using the consumer application.

"Operators" are system users who replay prediction scenarios during evaluation. An operator uses a replay system or product, and may be a developer of predictive engines. An operator, in contrast to an ordinary end-user, may be a software developer, a programmer, and/or a data scientist.

"Prediction Score" and "Prediction Score of a Query" is a value that represents the prediction performance of a deployed engine variant for a given query. A prediction score is calculated by at least one pre-defined or operator-defined score function, based on prediction result(s) and actual result(s) associated with the query.

"Replay Groups" refer to segments of queries that may be created with query segment filters, examples of which include engine variant filter, user attribute filter, item attribute filter, query attribute filter, and other conditional filters capable of selecting a subset of available queries for performance analysis and monitoring.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention relate to methods and systems for building and deploying machine learning systems for data analytics. Such machine learning systems may reside on one or more dedicated servers, or on on-site client terminals such as desk PCs or mobile devices. More particularly, embodiments of the present invention relate to creating and deploying predictive engines in production, and systematically evaluating and tuning predictive engine parameters to compare different algorithms, engine variants or engines. In addition, embodiments of the present invention relate to tracking and replaying queries, events, prediction results, and other necessary metrics for deducing and determining factors that affect the performance of a machine learning system of interest. A replay loop may serve to provide operators (developers and data scientists) insights into the selection and tuning of data sources, algorithms, algorithm parameters, as well as other engine parameters that may affect the performance of a predictive engine.

Generally, to create a smart application involving a machine learning system, a developer needs to first establish and train machine learning models or algorithms using training data collected from one or more sources. Such training data may also be simulated by historical data collected internally or externally by the machine learning system. A system parameter may indicate how training data is prepared and sampled for training predictive models. Next, training data are cleansed and unified into a consolidated format, and may be further randomly sampled or additionally processed, before being passed to and analyzed by the machine learning algorithms to determine system parameters that may specify which algorithms are to be evoked during deployment, and the corresponding algorithmic parameters. The resulting algorithmic parameters provide a trained predictive model. Collectively, parameters for a machine learning system control and specify data sources, algorithms, as well as other components within the system.

For example, to establish an algorithmic trading system, past prices and market trends may be analyzed to regress and extrapolate for future trading decisions. In this case, analysis of training data may determine regression coefficients for computing future trading prices or volume thresholds. Another example of a machine learning system is a recommendation engine for predicting products that users of an e-commerce website may potentially purchase. Such product recommendations may be personalized, or filtered according to business rules such as inventory conditions and logistical costs. Analysis of training data may determine brand names, price ranges, or product features for selecting and ranking products for display to one or a group of customers. In this example, system parameters may specify which sources are to be employed as training data, what type of data cleansing is carried out, which algorithms are to be used, regression coefficients, and what business rules are to be applied to prediction results.

Once a machine learning system is established, it can be deployed as a service, for example, as a web service, to receive dynamic user queries and to respond to such queries by generating and reporting prediction results to the user. Alternatively, prediction results may be served in desired formats to other systems associated or not associated with the user. As subsequent user actions or actual correct results can be collected and additional data may become available, a deployed machine learning system may be updated with new training data, and may be re-configured according to dynamic queries and corresponding event data. In addition, predictive models may be configured to persist, thus become re-usable and maintainable.

In addition to creating and deploying machine learning systems, the inventors of the present invention have created methods and systems for evaluating and tuning machine learning systems in production. In the present invention, variants of predictive engines and algorithms are evaluated by an evaluator, using one or more metrics with test data. Test data include user queries, predicted results, and actual results or corresponding subsequent user behaviors or sequences of user actions captured and reported to the evaluator. Test data, including actual results, can also be simulated using data collected internally or externally by the machine learning system. Evaluation results thus generated are used in automatic parameter set generation and selection for the machine learning system. Multiple instances of a predictive engine, or engine variants, may be evaluated at the same time and subsequently compared to determine a dynamic allocation of incoming traffic to the machine learning system. Furthermore, the inventors of the present invention have created methods and systems for monitoring and replaying queries, predicted results, subsequence end-user actions/behaviors, or actual results, and internal tracking information for determining factors that affect the performance of the machine learning system. For example, iterative replay of dynamic queries, corresponding predicted results, and subsequent actual user actions may provide to operators insights into the tuning of data sources, algorithms, algorithm parameters, as well as other system parameter that may affect the performance of the machine learning system. Prediction performances may be evaluated in terms of prediction scores and visualized through plots and diagrams. By segmenting available replay data, prediction performances of different engines or engine variants may be compared and studied conditionally for further engine parameter optimization.

In addition, through an Application Programming Interface (API), these monitoring and replaying methods and systems may work for not only engines deployed on the machine learning system specified here, but also external engines and algorithms. In other words, implementations of monitoring and replaying of engine configuration and performances may be separate from the engine deployment platform, thus allowing external monitoring and replaying services to be provided to existing predictive engines and algorithms.

One feature of the present invention is its focus on engine parameters instead of just algorithmic parameters. Engine parameters include hyperparameters such as data sources, algorithms employed, and business logic parameters in addition to configuration and data inputs to individual algorithms. Such engine level considerations allow engine level comparisons. Instead of tuning algorithmic parameters alone, embodiments of the present invention allow additional selection of data sources, algorithms, business rules, and any other characteristic of the engine under consideration. Engine variants may be chosen by an operator or developer, based on a template with default values, or generated automatically. Multiple variants of an engine deployed according to different engine parameter sets can thus utilize different algorithms or data sources, offering a much wider variety of deployable engine instances for comparison and much more flexibility for performance optimization.

Another feature of the present invention is that it is capable of tracking multiple user actions, behaviors, or responses both immediately and over a delayed time frame. Sequences of user actions, such as mouse clicks followed by an online purchase, may be grouped and tracked under the same tracking tag or replay tag associated with a particular query. In addition, user actions may be tracked across different sessions, cohorts, according to different segmentation rules.

With the ability to track and replay prediction history, embodiments of the present invention not only allow developers and data scientists to track prediction accuracy, but also enable them to troubleshoot and reconfigure the system as needed. Instead of just returning prediction success or failure rates for determining whether one variant performs better than another, embodiments of the present invention can replay the whole prediction scenario, from engine parameters, queries, prediction results, to actual results, user interactions, and evaluation metrics, to help developers understand particular behaviors of engine variants of interest, and to tailor and improve prediction engine design. The graphical or textual visual replay of evaluation and tuning results not only makes the whole process easier to use, but also allows interactive engine parameter tuning by an operator.

PredictionIO is a trademark name carrying embodiments of the present invention, and hence, the aforementioned trademark name may be interchangeably used in the specification and drawing to refer to the products/services offered by embodiments of the present invention. The term PredictionIO may be used in this specification to describe the overall machine learning system creation, evaluation, and tuning processes of the invention. The term "PredictionIO Enterprise Edition" is one version of the PredictionIO platform offered and sold to enterprise customers, with certain enhanced features above the baseline version. Of course, the present invention is not limited to the trademark name PredictionIO, and can be utilized by any naming convention or trademark name whatsoever.

With reference to the figures, embodiments of the present invention are now described in detail.

System Architecture

FIG. 1 shows a schematic diagram of a network configuration 100 for practicing one embodiment of the present invention. A user-device or devices 110 may be connected to a PredictionIO server or platform 130 through network 120. For example, a user-device may be a smart phone 102, laptop 104, desktop PC 106, or tablet 108. A user-device may also be wearable devices such as a watch, smart glasses, or an electronic tag. A user-device may be activated by user actions, or pre-installed programs. PredictionIO server 130 is a platform for creating, deploying, evaluating, and tuning machine learning systems. In some embodiments, PredictionIO server 130 is a predictive engine deployment platform where predictive engines are machine learning systems for generating predictions and decisions. In some embodiments, PredictionIO server 130 is a distributed system. For example, data store and processing algorithms may be located on different devices; engine deployment, monitoring, and evaluation may also be implemented separately. In this embodiment, PredictionIO server 130 is connected to one or more user devices 110 through the wireless network or the wired network 124. The wireless network comprises a cellular tower 122, or a wireless router 126. The wired network 124 or the wireless network may employ technologies and protocols comprising Ethernet technology, Local Area network (LAN), Wide Area Network (WAN), and optical network, and the like. In another embodiment of the present invention (not shown here), PredictionIO server 130 may be implemented directly in a user-device such as 102, 104, 106, or 108. Local installations of the PredictionIO service remove remote connectivity requirements in the network configuration 100. Local installations of PredictionIO server 130 may be subjected to additional software or hardware constraints.

Figure 2A:
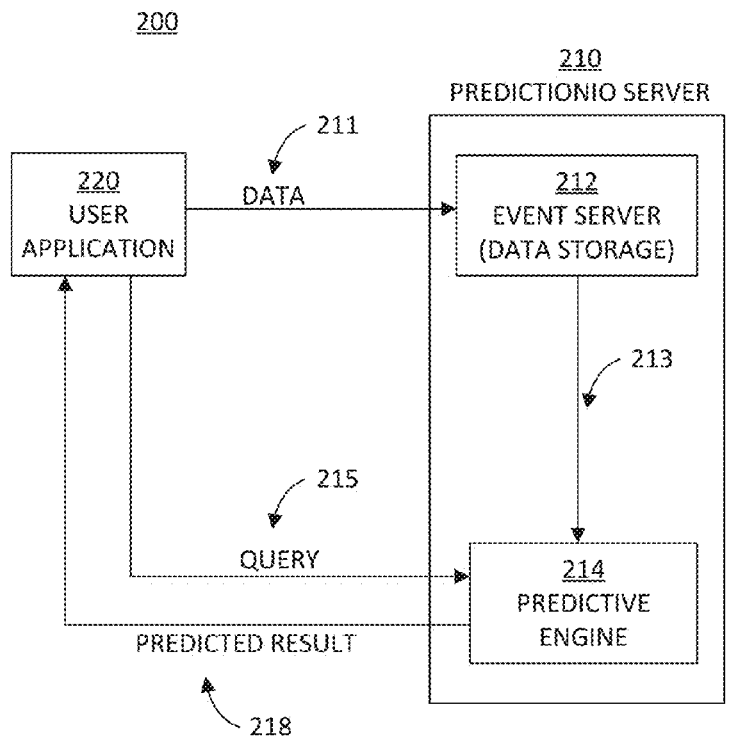
FIG. 2A is a diagram showing a machine learning framework based on a single predictive engine, according to one embodiment of the present invention.

FIG. 2A is diagram showing an architectural overview 200 of a deployable machine learning framework based on a single predictive engine, according to an exemplary embodiment of the present invention. In this embodiment, PredictionIO server 210 is composed of event server 212 and a predictive engine 214. Event server 212 is a scalable data collection and analytics layer. Event server 212 is responsible for importing data 211, in real-time or in batch, from user application 220, which may be a mobile application, a website, an email campaign, an analytical tool, or any other type of applications that may receive or collect user input, action, or information. "User" refers to an entity that interacts with PredictionIO Server 210 or predictive engine 214, and may or may not be a person. In one embodiment, event server 212 uses Apache HBase as the data store. Event server 212 unifies data received from multiple channels or sources into unified data 213. For example, such multiple channels or sources may be one or more user applications, or different logical storage units on one or more user applications or devices. In some embodiments, one data source may indicate what a user or customer has done on a mobile application, another data source may indicate the customer's browsing history, yet another data source may indicate user behaviors within a retail store. In this example, data 211 may comprise user IDs, product IDs, product attributes, user preferences and user rating for particular products, as well as other user actions. Event server 212 unifies or aggregates data 211, possibly into a preferred format, under a user email address or user login ID if such information is known. Alternatively, data 211 may be tagged with an entity ID such as a cookie ID for users or visitors who have not login into the system. In production, new event data may be continuously pushed into the event server 212, which in turn integrates the new data with existing datastore. When new data are integrated, predictive engine 214 may be trained automatically or upon request, and the resulting new model may be exchanged with the existing model. In summary, event server 212 serves two main purposes. It provides data to predictive engines for model training and evaluation, and offers a unified view for data analysis. In addition, like a database server, an event server can host multiple applications.

In some embodiments of the present invention, event server 212 may be a component of predictive engine 214 instead of being an independent entity. In addition, not all input data to predictive engine 214 must be streamed from event server 212. In some embodiments, predictive engine 214 may read data from another datastore instead of event server 212.

Based on unified data 213, predictive engine 214 can be created. Predictive algorithms can be selected to represent a given type of prediction problem or task. Examples of prediction tasks include recommendations and classifications.

For instance, a similar item recommendation task may seek to predict items that are similar to those on a given list; a personalized recommendation task may seek to predict which items a given user or users are inclined or more likely to take actions on; and a classification task may seek to predict whether a given document of text body is a suggestion or a complaint. PredictionIO server 210 may provide template predictive engines that can be modified by a developer for rapid development of system 200. Predictive engine 214 may contain one or more machine learning algorithms. It reads training data to build predictive models, and may be deployed as a web service through a network configuration 100 as shown in FIG. 1 after being trained. A deployed engine responds to prediction queries from user application 220, possibly in real-time, or over a given span of time.

After data 211 are sent to event server 212, continuously or in a batch mode, predictive engine 214 can be trained and deployed as a web service. User application 220 may then communicate with engine 214 by sending in a query 215, through an Application Programming Interface (API) or a REST interface; such interfaces may be automatically provided by Prediction IO platform 210. An exemplary query is a user ID. In response, predictive engine 214 returns predicted result 218 in a pre-defined format through a given interface. An exemplary predicted result is a list of product IDs. In the classification example previously discussed, query 215 may be a paragraph of text input, and predicted result 218 may be an alphanumerical string that indicates whether the input text is a suggestion or a complaint. In the similar item recommendation task, query 215 may be a set of item IDs such as (P1, P2, P3), while predicted result 218 may be another set of item IDs such as (P10, P11), indicating that products P10 and P11 are similar to the given products P1, P2, and P3. Similarity among different items may be defined through numerical scores and/or non-numerical criteria. In the personalized recommendation task, query 215 may be a user ID, while predicted result 218 may be a set of item IDS such as (P10, P11), indicating that the user with the given ID is more likely to take actions on product P10 and P11.

Figure 2B:
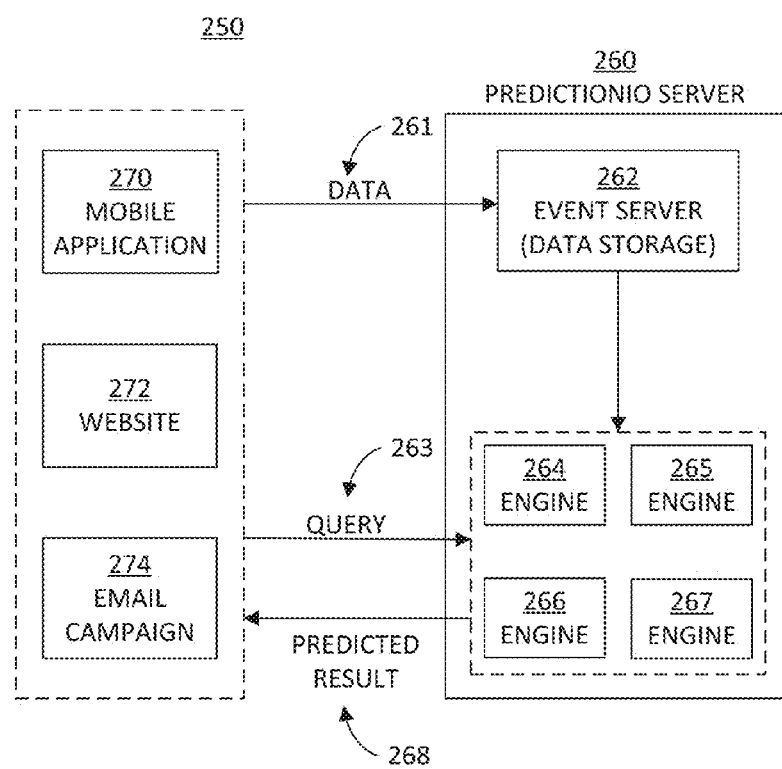
FIG. 2B is a diagram showing a machine learning framework based on multiple predictive engines, according to one embodiment of the present invention.

FIG. 2B is a diagram showing an architectural overview of a deployable machine learning framework 250 based on multiple predictive engines, according to one embodiment of the invention. Here each of mobile application 270, website 272, and email campaign 274 sends user input, behavior, and/or other related data 261 to event server 262, continuously or in a batch mode. Instead of a single predictive engine, different engines, shown as engines 264, 265, 266, and 267, may be built for different purposes within PredictionIO server or platform 260. In the product recommendation example, engine 264 may help a customer browsing an e-commerce website discover new products of interest. Another engine 265 may be used for generating product recommendations or sales notifications in an email campaign. For instance, based on what the customer has browsed in the past few days, a similar or a related product may be presented in an email newsletter to the customer so the customer will return to the e-commerce website. In this particular example, browsing history in the form of data 261 may be collected through mobile application 270 and website 272 over a given span of time such as an hour, a day, or a week; query 263 may be generated automatically by an email client; and predicted result 268 may be served in the form of texts or graphical elements through email campaign 274.

Similar to system 200 shown in FIG. 2A, each of mobile application 270, website 272, and email campaign 274 may communicate with engines 264, 265, 266, 267 by sending in data 261 or query 263. A subset or all of the available predictive engines may be active, depending on data 261, or other engine parameter settings as configured through PredictionIO server 260. In response, predictive engines return one or more predicted results 268, individually or in combination, in a possibly pre-defined format.

Even though only three user applications 270, 272, 274, and four predictive engines 264, 265, 266, 267 are shown in FIG. 2B, System 250 may be scaled to include many more user applications, and PredictionIO server 260 may be scaled to include fewer or many more predictive models. Additional user applications may each reside on the same or separate devices or storage media. In addition, PredictionIO server 260 may be scaled to include multiple predictive engines of different types on the same platform. Event server 262 may function to provide input data to all predictive engines, or more than one event server may be implemented within PredictionIO server 260. For example, depending on the type of prediction required, subsets of data 261 may be stored separately into multiple event servers and indexed correspondingly.

Figure 3A:
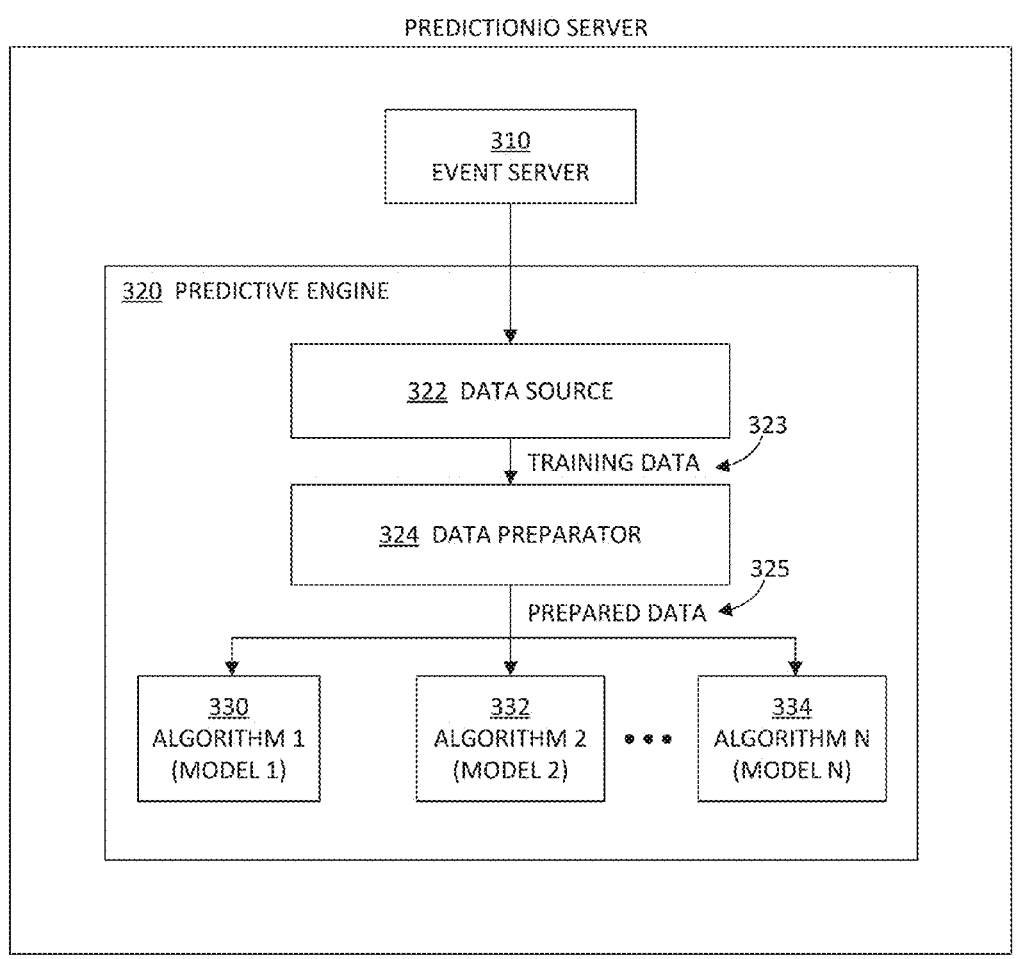
FIG. 3A is a diagram showing a machine learning framework and the components of a predictive engine involved in training predictive models, according to one embodiment of the present invention.

FIG. 3A is a diagram showing the components of a predictive engine involved in training predictive models within the predictive engine, according to one embodiment of the present invention. After user data has been collected into event server 310, they can be pulled into data source 322 of predictive engine 320. In addition to reading data from a datastore, data source 322 may further process data from event server 310 according to particular settings of predictive engine 320. Data source 322 then outputs training data 323 to data preparator 324, which cleanses and possibly reformats training data 323 into prepared data 325. Prepared data 325 are then passed to all algorithms 330 to 334, automatically or upon request. Predictive algorithms such as algorithms 330 to 334 here are components of a predictive engine for generating predictions and decisions. A predictive engine may include one or more algorithms, to be used independently or in combination. For example, separate algorithms may be employed to handle different types of user event data, or a single algorithm may be implemented to take different types of user event data into account. Each algorithm is configured to perform at least two functions, train and predict. One is for training the corresponding predictive model, the other is for employing the predictive model for generating a predict result. During training, each algorithm returns a predictive model, which is in turn cached by PredictionIO server 300 such that models may persist and can be returned once recommendations need to be made. The models maybe in a distributed or a non-distributed object format, and PredictionIO server 300 may provide dedicated programming class interfaces for accessing such model objects.

To facilitate the creation and deployment of a predictive engine, a PredictionIO server such as 300 may provide programming templates for creating each component of predictive engine 320. For example, a read function of data source 322 may be called directly to return training data 323, and a prepare function of data preparator 324 may be called to process training data 323 into prepared data 325. Each of algorithms 330 to 334 processes prepared data 325 to determine model or object parameters.

Figure 3B:
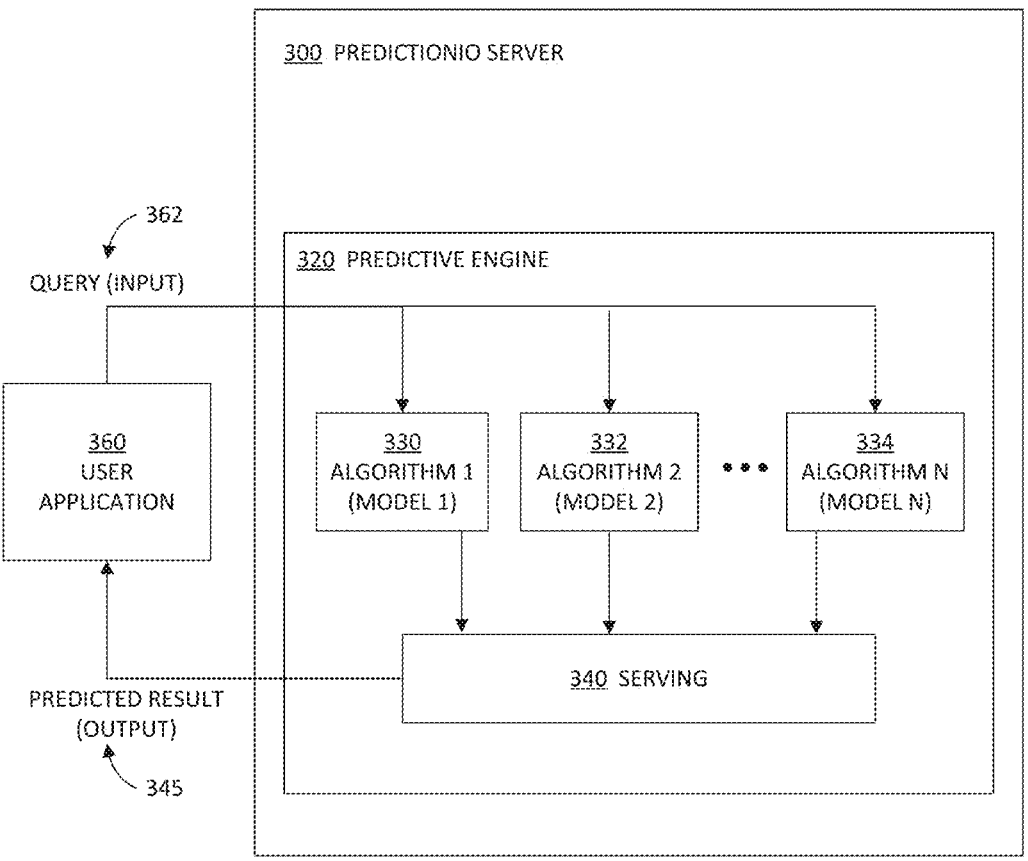
FIG. 3B is a diagram showing a machine learning framework and the components of a predictive engine involved in responding to dynamic queries to the predictive engine, according to one embodiment of the present invention.

FIG. 3B is a diagram showing the components of a predictive engine involved in responding to dynamic queries to the predictive engine, according to one embodiment of the present invention. After predictive engine 320 has been trained, it can be deployed, as a web service through network 120 as shown in FIG. 1, or as a local installation on client devices. Once trained and deployed, predictive engine 320 may respond to dynamic query 362 from user application 360. Query 362 may be in a predefined format, and predictive engine 320 may conduct further conversion of query data 362 before passing it to one or more trained algorithms or models 330 to 334, to trigger a predict function within each algorithm that has defined this particular function. As a result, each active algorithm or predictive model returns a predicted result in response to dynamic query 362. For example, the predicted result may be a list of product IDs, or a list of product recommendation scores associated with a list of product IDs. The predicted results are passed to a serving component 340 of predictive engine 320. Serving component 340 further processes and aggregates the prediction results to generate a predicted result 345 for output back to user application 360. Algorithm's predict function and Serving 340 may further include real time business logics for filtering and processing prediction results from some of algorithms 330 to 334. For example, while in production, a product inventory may become depleted, thus a product recommendation for purchase may need to be adjusted accordingly. In another example, serving 340 may take into account logistical costs to determine whether products within a particular price range are more likely to be considered by a customer, thus should be recommended to the customer through user application 360. Alternatively, serving 340 may combine prediction results from a selected subset of algorithms. The returned predicted result 345 may be automatically structured into a programming object easily convertible to other formats by PredictionIO platform 300.

To facilitate evaluation and tuning of predictive engine 320, its inputs, outputs, and internal parameters may be tagged and replayed. More detailed descriptions will be provided with reference to FIGS. 4 to 8.

Figure 4:
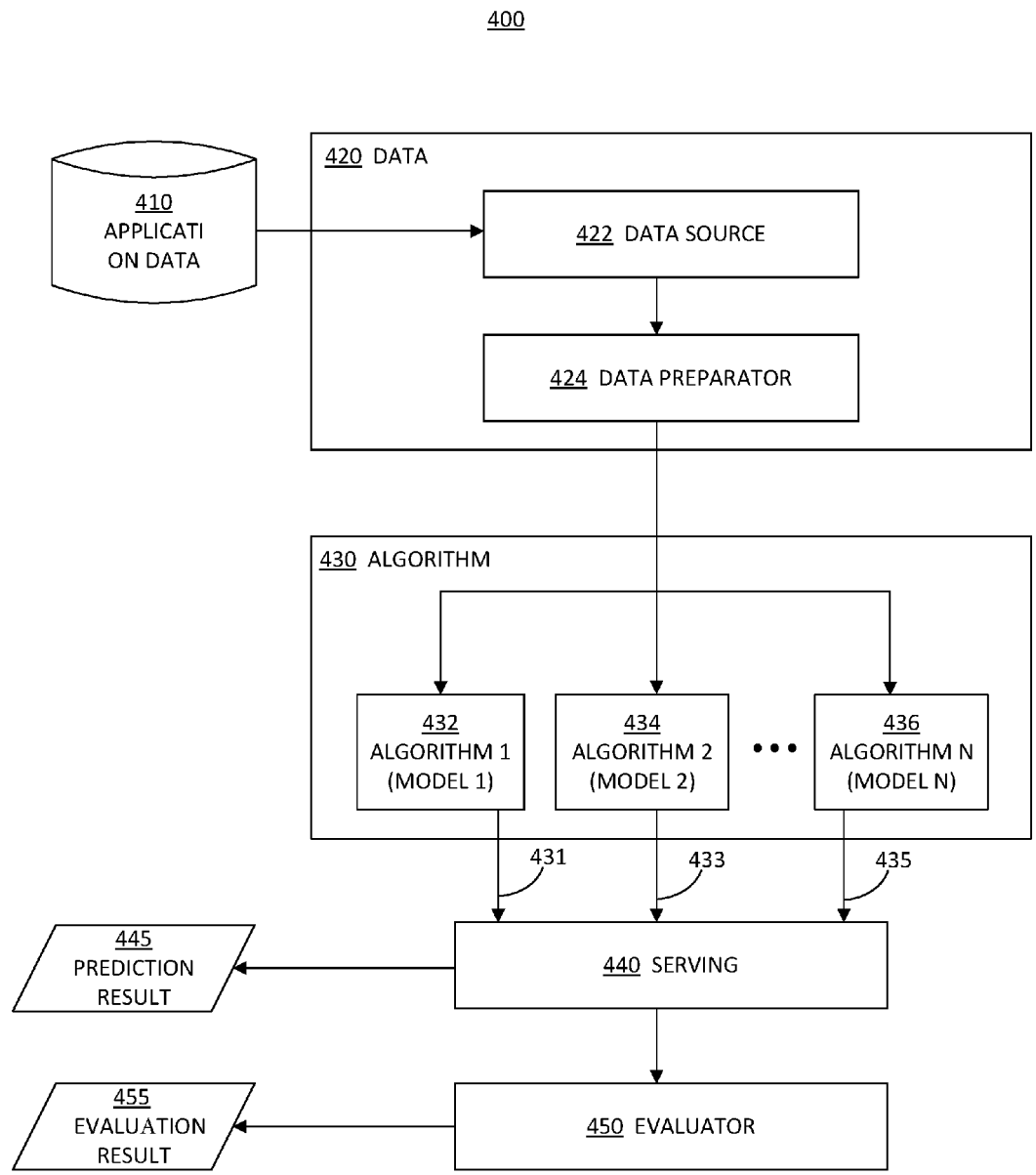
FIG. 4 is a diagram showing the structure of a predictive engine, according to one embodiment of the present invention.

FIG. 4 is a diagram showing the overall structure of a predictive engine 400, according to one embodiment of the present invention. Predictive engine 400 may be separated into four major components, Data 420, Algorithm 430, Serving 440, and Evaluator 450, also known as a "DASE" architecture. The first three components Data 420, Algorithm 430, and Serving 440 have been discussed with reference to FIGS. 3A and 3B. This DASE architecture provides a separation of concerns (SoC) that allows developers to exchange and replace individual components in predictive engine design. In other words, the DASE architecture is a Model-View-Controller (MVC) for machine learning systems. All components of the DASE architecture are controlled by an engine factory object (not shown here) defined as part of a PredictionIO server.

The first Data component 420 refers to data source 422 and data preparator 424. In FIG. 3A, data source 322 and data preparator 324 receive data from event server 310. Similarly, in FIG. 4 here, data source 422 imports application data 410, possibly from an event server implemented on a PredictionIO platform. Data source 422 functions as a reader of internal or external datastores, while data preparator 424 cleanses training data before passing prepared data to Algorithm component 430 of predictive engine 400. Some exemplary functions of data preparator 424 are to reformat and aggregate training data as desired, and to sample a subset of training data using a pre-defined random sampling strategy. In some embodiments, data preparator 424 may be excluded from Data component 410, and training data may be passed directly from data source 422 to Algorithm component 430 of predictive engine 400. The inclusion or exclusion of data preparator 424 may be useful in evaluating the performance of predictive engine 400 under different settings or configurations.

The second Algorithm component 430 of predictive engine 400 comprises one or more algorithms, denoted as algorithms 432 to 436 in FIG. 4. A very simple example of an algorithm within Algorithm component 430 is a non-personalized, trending algorithm that recommends products which are most popular in the store at the moment. A more complicated example may be a personalized algorithm that takes into account products a particular customer has purchased in the past. A single predictive engine 400 may contain multiple algorithms; each can be trained as discussed previously with reference to FIG. 3A, and activated or called upon request as discussed previously with reference to FIG. 3B. However, not all algorithms have to be trained or called at the same time. The selection of algorithms within Algorithm component 430 could depend on the availability of training data, computing resources, or other factors. The selection of algorithms is specified by parameters of predictive engine 400. In addition, a subset of algorithms can be selected for best performance, as will be discussed with reference to FIG. 8. Furthermore, data from preparator 424 may be sampled separately for each algorithm for best performance. In some embodiments, the output of the training process includes a model part and a meta-data part. The trained models and meta-data are stored in a local file system, in HDFS, or another type of storage. Meta-data may include model versions, engine versions, application ID mappings, and evaluation results.

Predicted results such as 431, 433 and 435 from activated algorithms are passed to Serving component 440. Serving component 440 can combine, filter, and further process prediction results according to real time business rules to generate predicted result 445. Such business rules may be updated periodically or upon request.

In addition, to evaluate the performance of the prediction process to compare different algorithms, algorithm parameters settings, as well as different engine variants, an Evaluator component 450 receives data from Serving component 440, and applies one or more metrics to compute evaluation results 455 as an output. An engine variant is a deployable instance of a predictive engine, specified by an engine parameter set. The engine parameter set includes parameters that control each component of a predictive engine. An evaluation metric may quantify prediction accuracy with a numerical score. Evaluation metrics may be pre-defined with default computation steps, or may be customizable by developers that utilize the PredictionIO platform.

Although not explicitly shown in FIG. 4, Evaluator 450 may receive actual results, including correct values, user actions, or actual user behaviors from a datastore or a user application for computing evaluation metrics. An actual result refers to a correct prediction result or an actual outcome of a prediction task. If a predicted result is the same as an actual result, the predicted result can be considered as an excellent prediction. Recall the exemplary queries and corresponding predicted results discussed with reference to FIG. 2A. In the classification task, an actual result may be the string "complaint", which is a correct classification of the text input. In the similar item recommendation task, an actual result may be product IDs (P10, P20), indicating that products P10 and P20 are similar to given items (P1, P2, P3), although the predictive engine suggests products P10 and P11. In a personalized recommendation task, an actual user behavior may be product IDs (P10, P20), indicating that the user selected products P10 and P20 for further viewing and purchase, after products P10 and P11 are recommended by the predictive engine. Another example of actual results is in algorithmic trading, where an actual result may be the actual opening or closing price of a particular stock on the next day. Actual results may be collected through user devices, read from storage, or simulated.

Prediction result 445 and evaluation result 455 can be passed to other components within a PredictionIO server. As discussed previously, a PredictionIO server is a predictive engine deployment platform that enables developers to customize engine components, evaluate predictive models, and tune predictive engine parameters to improve performance of prediction results. A PredictionIO server may also maintain adjustment history in addition to prediction and evaluation results for developers to further customize and improve each component of an engine for specific business needs.

In some embodiments of invention, Apache Spark can be used to power the Data, Algorithm, Serving, and Evaluator components. Apache Spark is a large-scale data processing engine. In this case, distributed algorithms and single-machine algorithms may both be supported by the PredictionIO Server.

Engine Parameter Tuning

A predictive engine within a PredictionIO platform is governed by a set of engine parameters. Engine parameters determine which algorithms are used and what parameters are to be used for each algorithm chosen. In addition, engine parameters dedicate the control of the Data component, Algorithm component, and Serving component of a predictive engine. In other words, engine parameters include parameters for each component controller. As engine parameters essentially teach how an engine is to function, engine parameters are hyperparameters. A given set of engine parameters specifies an engine variant.

The determination and tuning of engine parameters is the key to generating good predictive engines. The evaluator component, also called an evaluation module, facilitates the engine tuning process to obtain the best parameter set. For example, in an classification application that uses a Bayesian algorithm, an optimal smoothing parameter for making the model more adaptive to unseen data can be found by evaluating the prediction quality against a list of parameter values to find the best value.

In some embodiments, to evaluate engine parameters, available data can be split into two sets, a training set and a validation set. The training set is used to train the engine, as discussed with reference to FIG. 3A, while the validation set is used to validate the engine by querying the engine with the validation set data, as discussed with reference to FIG. 3B. Validation set data include actual results or action user behaviors. One or more metrics can be defined to compare predicted results returned from the engine with actual results among the validation data. The goal of engine parameter tuning is to determine an optimal engine parameter set that maximizes evaluation metric scores. The higher the score, the better the engine parameter set. For example, a precision score may be used to measure the portion of correct predictions among all data points. In some embodiments, training and validation data are simulated by the PredictionIO platform.

Figure 5A:
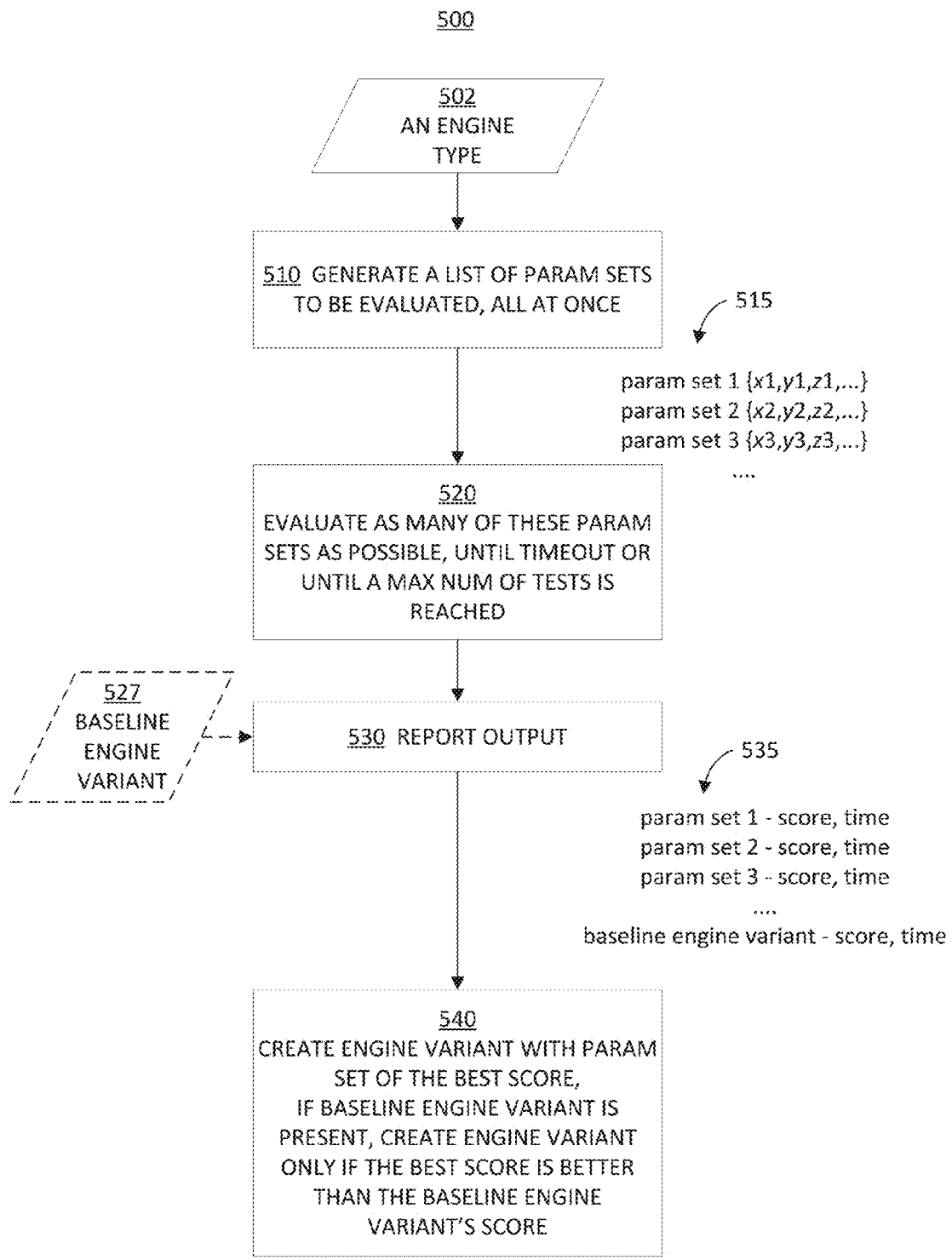
FIG. 5A is a diagram showing a method of automatically tuning parameters of a predictive engine by evaluating a generated list of parameters sets, according to one embodiment of the present invention.
Figure 5B:
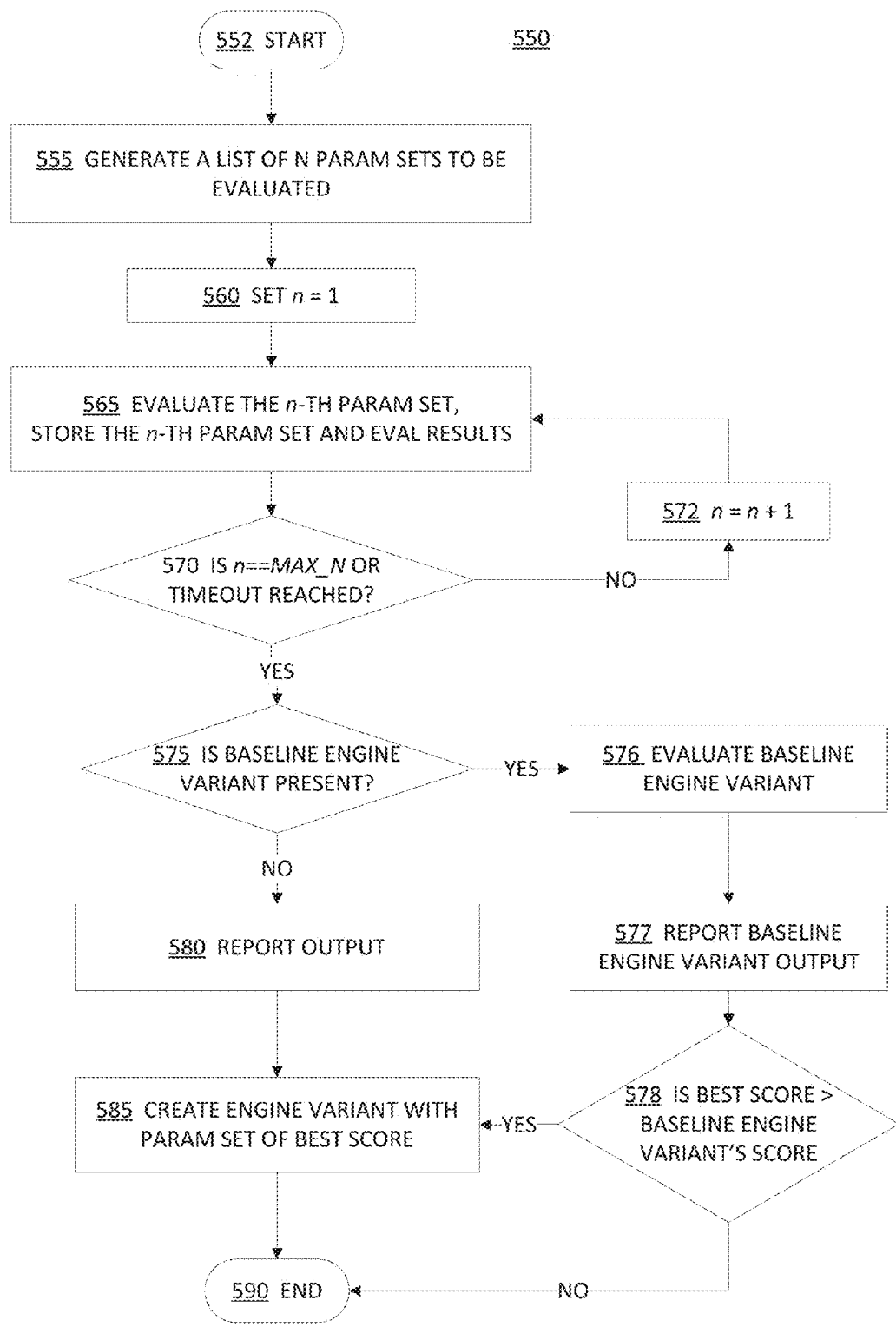
FIG. 5B is a flowchart showing a method of automatically tuning parameters of a predictive engine by evaluating a generated list of parameters sets, according to one embodiment of the present invention.

FIG. 5A is a use flow diagram 500 showing a method of automatically tuning parameters of a predictive engine by evaluating a generated list of parameter sets, according to one embodiment of the present invention. Correspondingly, FIG. 5B is an exemplary flow diagram 550 showing a detailed implementation of the use flow 500 shown in FIG. 5A. In FIG. 5A, given an engine type 502, a parameter generator generates a list of engine parameter sets all at once at step 510. In some embodiments, a list of engine parameter sets can be generated from a base engine parameter set by adding or replacing controller parameters. In some embodiments, a list of engine parameter sets can be generated from a base engine parameter set by incrementally changing the value of one parameter within the base parameter set. The base engine parameter set may take on default values stored in a PredictionIO platform, may be generated manually by an operator, or may be generated automatically. In some embodiments, the base engine parameter set may be derived from previous engine parameter set tuning and evaluation steps not shown in FIG. 5B. The base engine parameter set may also be included in the newly generated engine parameter sets. In other words, one of the newly generated engine parameter sets may equal to the base engine parameter set.

The generated list of engine parameter sets 515 are evaluated one by one at step 520 according to a chosen evaluation metric or multiple chosen metrics, until timeout or until a maximum number of tests is reached. In this example shown in FIG. 5A, the n-th engine parameter set is represented as the tuple $(x_n, y_n, z_n, \ldots)$, where each element of the parameter set may take on different variable types. In some embodiments, a baseline engine variant is presented as an optional input 527 and is also evaluated. Baseline engine variant 527 is of engine type 502, and may take on default engine parameter values stored in a PredictionIO platform, may be generated manually by an operator, or may be generated automatically. The parameter value, evaluation score, and computation time of each of the engine parameter set and the baseline engine variant are reported at step 530 as output 535. Subsequently, a new predictive engine variant is created at step 540 with the parameter set having the best score. If a baseline engine variant is present, an engine variant is created only if the best score is better than the baseline engine variant's score. The whole engine and its complete parameter set (entire DASE stack, see definitions section), or any sub-component and its associated parameters, may be tuned. This illustrative example shows the tuning of engine parameter sets. In other words, the Data source/data preparator, Algorithm, Serving, and Evaluation components and their parameters can all be tuned in this manner as presented herein.

FIG. 5B illustrates an exemplary implementation of the engine parameter tuning process shown in FIG. 5A as a flow diagram 550. At step 555, a list of a given N number of parameter sets are generated to be evaluated. At step 560, an iteration index n is set to 1. Evaluation of the n-th parameter set is carried out at step 565, and the evaluation result is stored in addition to the n-th parameter set itself. If neither a maximum number of tests MAX_N nor timeout has been reached at step 570, the parameter generation and evaluation processes continue through step 572, where the iteration index n is incremented. Otherwise, the presence of a baseline engine variant is considered at step 575. Without a baseline engine variant, the parameter sets and corresponding evaluation results are reported at step 580, and a new engine variant with a parameter set of the best score is created at step 585 before the tuning process terminates at step 590. If a baseline engine variant is present, the evaluation result for the baseline engine variant is evaluated at step 576, reported at step 577, and compared to that of the best score out of the list of parameter sets at step 578. A new engine variant is then created only if the best score is better. In addition to the process shown in flow chart 550, alternative implementations of the use flow 500 is also possible.

Figure 6A:
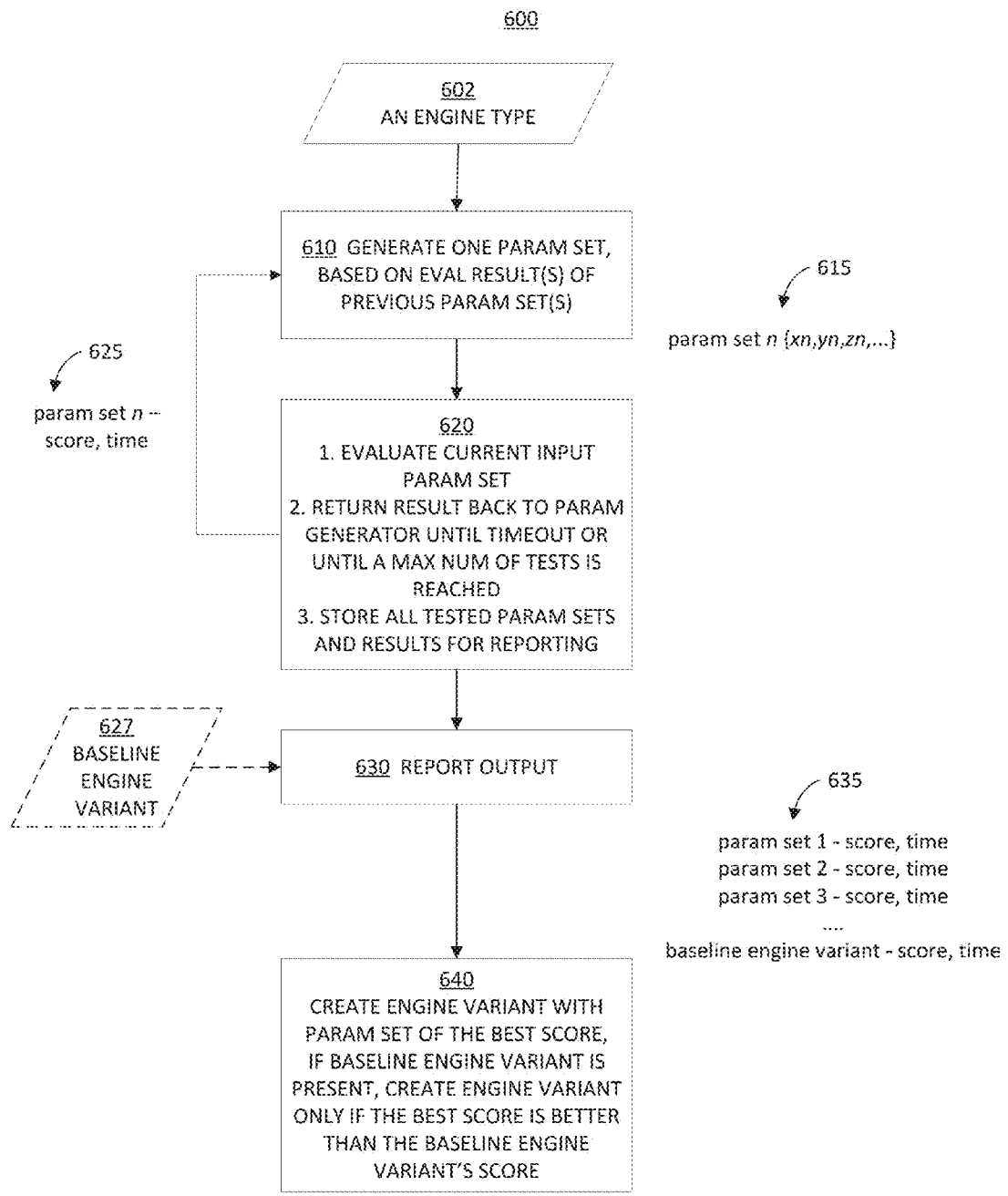
FIG. 6A is a diagram showing a method of automatically tuning parameters of a predictive engine by evaluating iteratively generated parameter sets, according to one embodiment of the present invention.
Figure 6B:
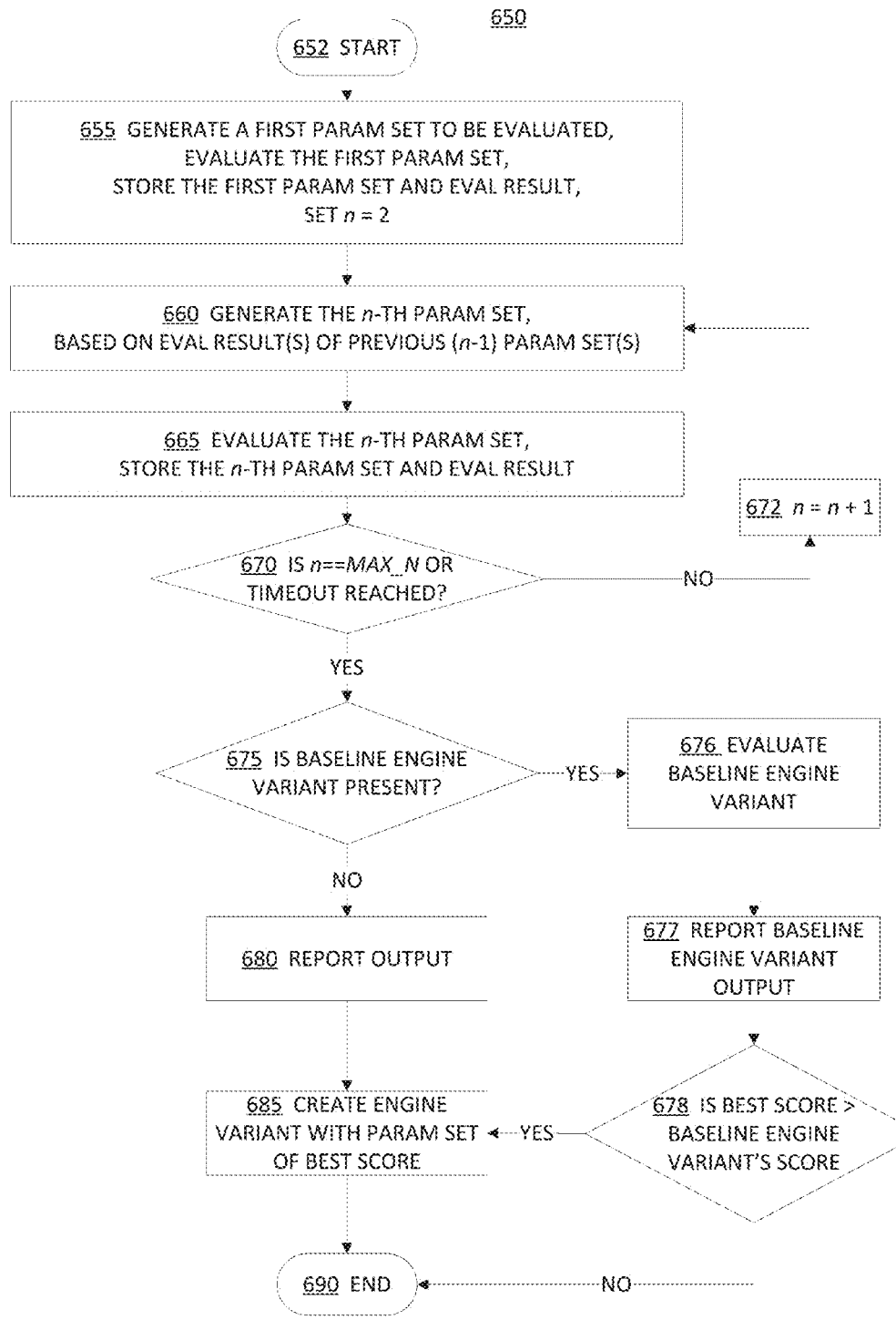
FIG. 6B is a flowchart showing a method of automatically tuning parameters of a predictive engine by evaluating iteratively generated parameter sets, according to one embodiment of the present invention.

FIG. 6A is a use flow diagram 600 showing a method of automatically tuning parameters of a predictive engine by evaluating iteratively-generated parameter sets, according to one embodiment of the present invention. Correspondingly, FIG. 6B is an exemplary flow diagram 650 showing a detailed implementation of the use flow 600 shown in FIG. 6A. In FIG. 6A, given an engine type 602, a parameter generator generates a first engine parameter set at step 610. The newly-generated engine parameter set 615 is evaluated at step 620 according to one or more pre-defined metrics, and the evaluation result 625 is returned to the parameter generator, unless a maximum number of tests or time out has been reached. The parameter generator then generates the next engine parameter set, based on evaluation results of some or all of the previous engine parameter sets. In some embodiments, a baseline engine variant is presented as an optional input 627 and is also evaluated. Baseline engine variant 627 is of engine type 602, and may take on default engine parameter values stored in a PredictionIO platform, may be generated manually by an operator, or may be generated automatically. The parameter value, evaluation score and computation time of each of the parameter set and the baseline engine variant are reported at step 630 as output 635, and an engine variant is created, or chosen, with the parameter set of the best score at step 640. If a baseline engine variant is present, a new engine variant is created only if the best score is better than the baseline engine variant's score. This illustrative example shows the tuning of engine parameter sets. In other words, the Data source/data preparator, Algorithm, Serving, and Evaluation components and their parameters can all be tuned in this manner as presented herein.

FIG. 6B illustrates an exemplary implementation of the engine parameter tuning process shown in FIG. 6A as a flow diagram 650. At step 655, a first set of engine parameters is generated, evaluated, and the corresponding results are stored. The iteration index n is set to 2. The first set of engine parameters may be generated from a base engine parameter set, where the base engine parameter set may take on stored default values, or may be derived from previous engine parameter set tuning and evaluation steps not show here. The first set of engine parameters may equal to the base engine parameter set. At step 660, the n-th engine parameter set is generated, based on evaluation results of some or all of the previous (n−1) engine parameter sets. Evaluation of the n-th parameter set is carried out at step 665, and the evaluation result is stored in addition to the n-th engine parameter set itself, for later reporting. If neither a maximum number of tests MAX_N nor timeout has been reached at step 670, the parameter generation and evaluation processes continue through step 672. Otherwise, the presence of an optional baseline engine variant is considered at step 675. Without a baseline engine variant, the parameter sets and corresponding evaluation results are reported at step 680, and a new engine variant with a parameter set of the best score is created at step 685 before the tuning process terminates at step 690. If a baseline engine variant is present, it is evaluated at step 676, the evaluation result is reported at step 677, and the evaluation result is compared to that of the best score out of the list of parameter sets at step 678. An engine variant is then created only if the best score is better. In addition to the process shown in flow chart 650, alternative implementations of the use flow 600 is also possible.

In some embodiments, a PredictionIO platform may deploy a variant of a given predictive engine with an initial set of engine parameters or an initial engine parameter setting. The initial engine parameter set may take on default values stored in memory, may be generated manually by an operator, or may be determined automatically. The deployed engine variant then receives queries, responds with predicted results, and receives back actual results. Evaluation results are then generated and the current engine parameter set and evaluation results are passed to an engine parameter generator. From time to time, the engine parameter generator generates a new parameter set based on evaluation results of the current variant, and sometimes, evaluation results of previously deployed variants. Such previously deployed variants may have been replaced by previously generated new engine parameter sets, and evaluation results of previously deployed variants may have been stored by the PredictionIO platform. The new engine parameter set generated in the current round may then be deployed to replace the existing engine variant. Replacing old engine variants is an optional feature, as old engine variants may also remain in memory for future analysis and comparison, if desired or necessary.

Figure 7A:
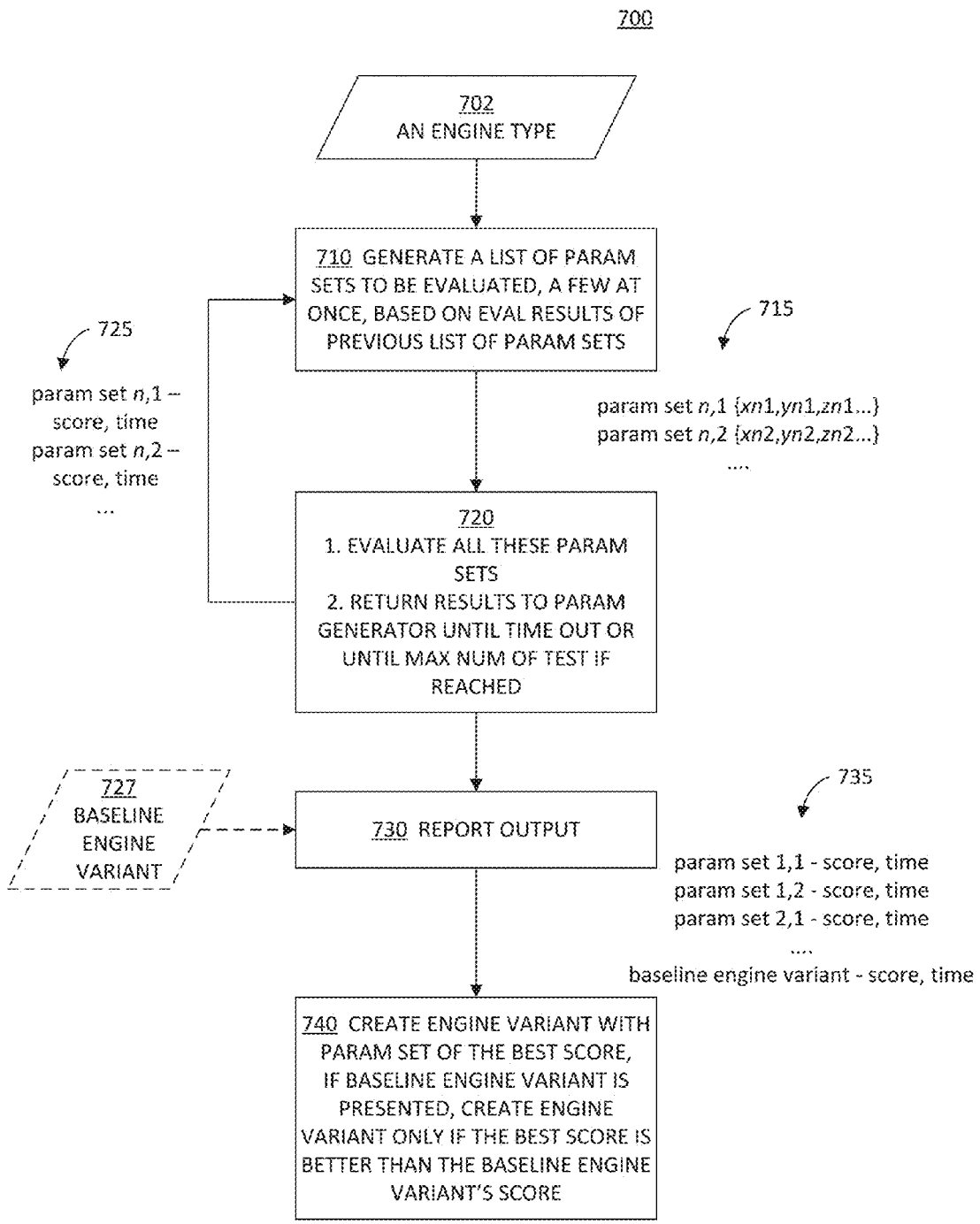
FIG. 7A is a diagram showing a method of automatically tuning parameters of a predictive engine by evaluating iteratively generated lists of parameters sets, according to one embodiment of the present invention.
Figure 7B:
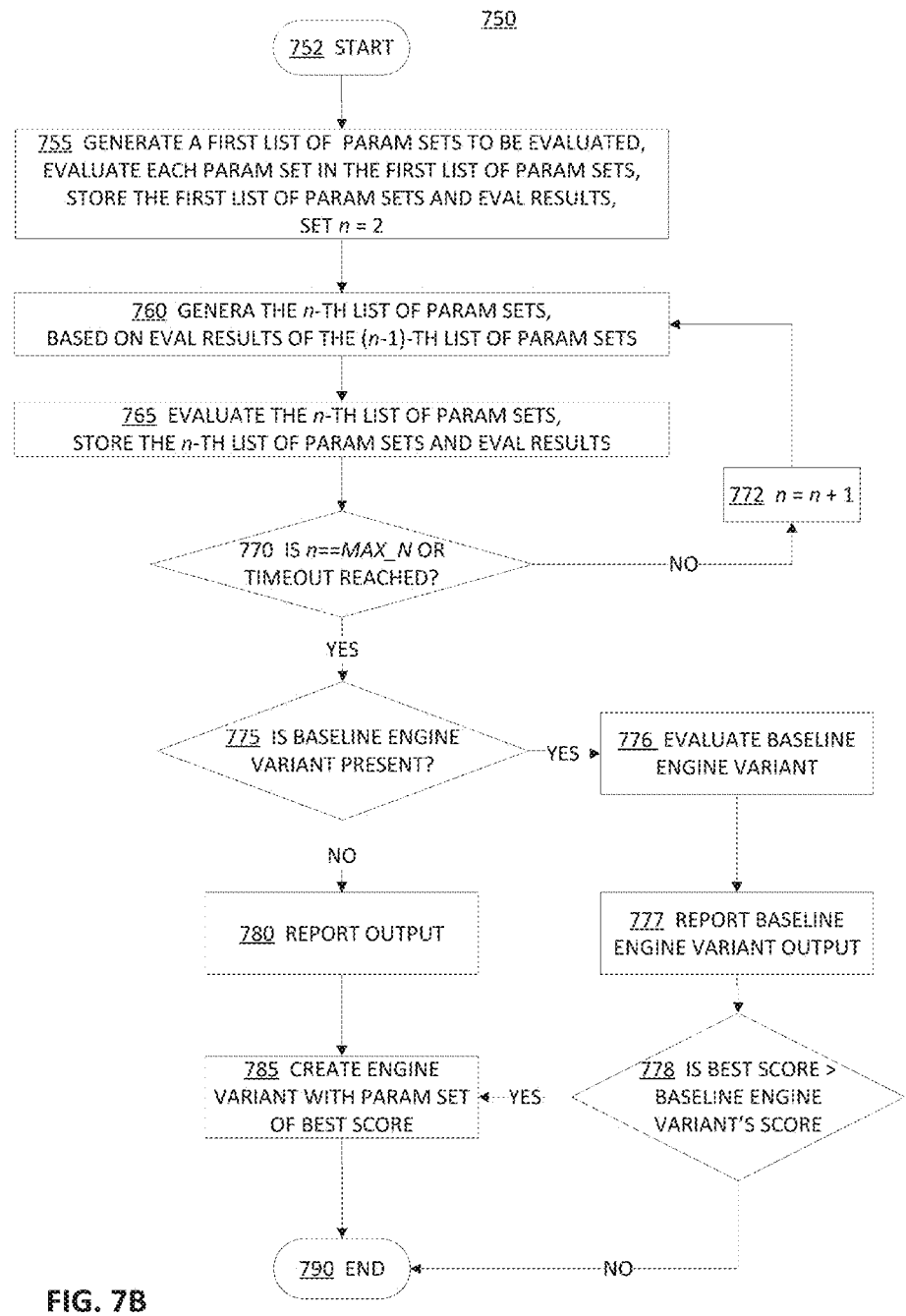
FIG. 7B is a flowchart showing a method of automatically tuning parameters of a predictive engine by evaluating iteratively generated lists of parameters sets, according to one embodiment of the present invention.

FIG. 7A is a use flow diagram 700 showing a method of automatically tuning parameters of a predictive engine by evaluating iteratively-generated lists of parameter sets, according to one embodiment of the present invention. Correspondingly, FIG. 7B is an exemplary flow diagram 750 showing a detailed implementation of the use flow 700 shown in FIG. 7A. In FIG. 7A, given an engine type 702, a parameter generator generates a first list, or batch, of engine parameter sets at step 710. The current list of engine parameter sets 715 is then evaluated according to one or more pre-defined metrics at step 720, and the evaluation results 725 are returned to the parameter generator, unless a maximum number of tests or time out has been reached. The parameter generator then generates the next list of engine parameter sets, based on evaluation results of the previous list of engine parameter sets. In this example shown in FIG. 7A, the n-th list of engine parameter sets is represented as tuples {(xn1, yn1, zn1, . . . ), (xn2, yn2, zn2, . . . ), . . . }, where each element of a parameter set may take on textual or numerical values. In some embodiments, a baseline engine variant is presented as optional input 727 and is also evaluated. Baseline engine variant 727 is of engine type 702, and may take on default engine parameter values stored in a PredictionIO platform, may be generated manually by an operator, or may be generated automatically. The parameter values, evaluation scores and computation times of each of the generated engine parameter sets and the baseline engine variant are reported at step 730 as output 735, and a new engine variant is created with the parameter set of the best score at step 740. If a baseline engine variant is present, a new engine variant is created only if the best score is better than the baseline engine variant's score. This illustrative example shows the tuning of engine parameter sets. In other words, the Data source/data preparator, Algorithm, Serving, and Evaluation components and their parameters can all be tuned in this manner as presented herein.

FIG. 7B illustrates an exemplary implementation of the engine parameter tuning process shown in FIG. 7A as a flow diagram 750. At step 755, a first list of engine parameter sets is generated, evaluated, and the corresponding results are stored. The iteration index n is set to 2. The first or initial list of engine parameter set may be generated from a base engine parameter set, or a base list of engine parameter sets, where the base engine parameter set or base list of engine parameter sets may take on stored default values, or may be derived from previous engine parameter set tuning and evaluation steps not show here. The first list of engine parameter sets may include the base engine parameter set or the base list of engine parameter sets. At step 760, the n-th list of engine parameter sets is evaluated, based on evaluation results of the (n−1)-th list of engine parameter sets. Alternatively, the n-th list of engine parameter sets may be evaluated based on evaluation results of all (n−1) previous lists of engine parameter sets. Evaluation of the n-th list of parameter sets is carried out at step 765, and the evaluation results are stored in addition to the n-th list of engine parameter sets itself, for later reporting. If neither a maximum number of tests MAX_N nor timeout has been reached at step 770, the parameter generation and evaluation processes continue through step 772. Otherwise, the presence of an optional baseline engine variant is considered at step 775. Without a baseline engine variant, the parameter sets and corresponding evaluation results are reported at step 780, and a new engine variant with a parameter set of the best score is created at step 785 before the tuning process terminates at step 790. If a baseline engine variant is present, it is evaluated at step 776, the evaluation result for the baseline engine variant is reported at step 777, and compared to that of the best score out of the list of parameter sets at step 778. A new engine variant is then created only if the best score is better that the score of the baseline engine variant. In addition to the process shown in flow chart 750, alternative implementations of the use flow 700 is also possible.

Prediction History Tracking

In addition to evaluating the performance of predictive engines and tuning engine parameter sets, a PredictionIO platform may record actual results, including subsequent user actions, actual correct results, or actual information of the previously unknown event now revealed, after a prediction has been made. Thus, prediction history can be tracked for updating predictive engines during deployment. Such prediction history tracking may be performed in real-time, with live evaluation results returned as feedback to predictive engines for further engine parameter tuning and prediction accuracy improvement. Prediction history may also be individually or collectively replayed to operators of predictive engines for troubleshooting purposes.

In some embodiments, a PredictionIO server generates and logs a unique tracking tag for each user query. Correspondingly, predicted results generated in response to the current query and parameters of the engine variant deployed are associated with the same tracking tag. A tracking tag may be an alphanumerical string, such as "X" or "X1", a tuple of alphanumerical strings such as "(X, 1)", or any other identifier capable of identifying individual queries. Recall that in some embodiments, a query may include identifying information including user ID, product ID, time, and location. Similarly, a tracking tag may be in the form of (user-device ID, user ID, time stamp). Subsequent actual results including user actions and behaviors, and actual correct results revealed after the prediction result has been served, are also logged under the same tracking tag. As a result, prediction results and actual results can be segmented or categorized according to identifying information such as product name, time, day of week, user categories, and/or attributes. User actions and/or behaviors may be monitored over a long period of time such as several hours, days, or even months. User actions or behaviors may also be logged as sequences instead of a set of individual events. For example, a user may click on five products before purchasing a particular product. All five user clicks and the purchase may be viewed together as a sequence of user actions. User actions or behaviors may also be further segmented according to connection sessions or even browsing windows. For example, user actions performed on one webpage may be recorded separately from user actions performed on another webpage, or they can be combined under the same user ID. Collectively, such tracking data as identified by the possibly unique tracking tag can be replayed to a developer of a predictive engine automatically or upon request to assist in improving and understanding the performance of predictive engines. Tracking tags are thus also called replay tags. As previously discussed, a user refers to any entity that interacts with a PredictionIO Server or predictive engines, and may or may not be a person.

More specifically, a PredictionIO server may include a replay loop to perform live evaluation of predictive engines with great details and high levels of accuracy. In some embodiments, a PredictionIO server provides a special data source (data reader) or event datastore that can use the tracking data to replay how a prediction engine performs. This data source is able to reconstruct the complete history of each user that queries the system. In addition to tracking tags specific to individual queries, other types of data characteristics or meta-data can be employed to group and sort tracking data. Such meta-data may or may not be part of the tracking tags themselves. A replay loop may be displayed graphically or textually to a developer of the system or an operator of the replay loop. Exemplary displays include event logs and graphs, time-series plots, performance curves, charts, and so on. The Prediction 10 server may also provide a special evaluator component that takes the complete history of each user and produce accurate and detailed reports of how each prediction performed. Besides obtaining a better picture of how the prediction engine performs in contrast to black-box tests, this level of detail enables fine tuning and troubleshooting of the prediction engine by data scientist and engine developers.

Figure 8:
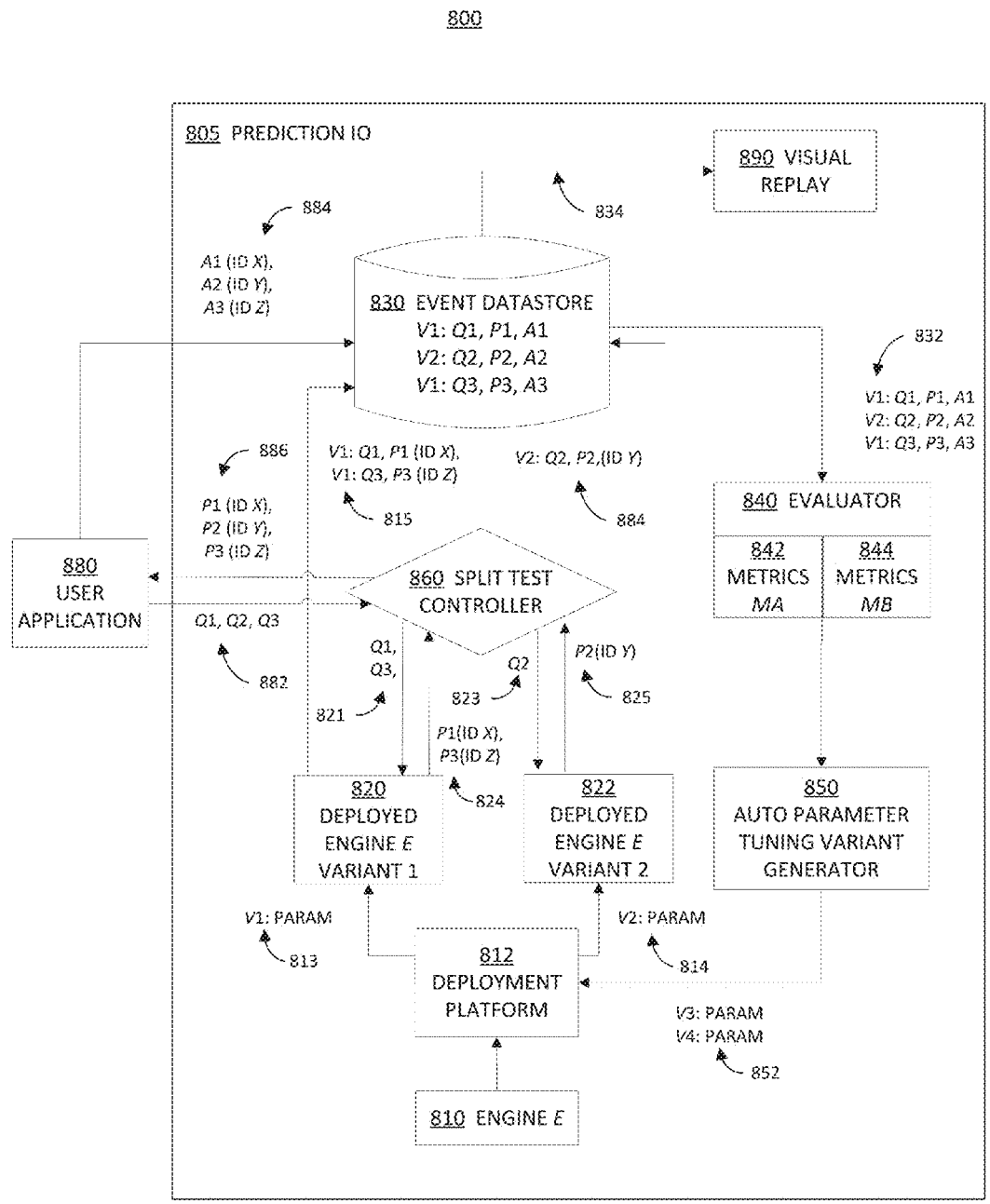
FIG. 8 is an illustrative diagram showing the process of evaluating and tuning two variants of a predictive engine, according to one embodiment of the present invention.

FIG. 8 is an illustrative diagram 800 showing a PredictionIO platform 805 in the process of evaluating and tuning two engine variants, according to one embodiment of the present invention. Other than user application 880, all components shown in FIG. 8 may be implemented as part of a PredictionIO platform 805. A distributed implementation is also possible.

In this embodiment, two variants of a predictive engine E are deployed through a PredictionIO platform. Each of the two variants receives queries from a user application and generates predicted results. Such predicted results are tagged with tracking or replay IDs, and subsequently evaluated, with their corresponding engine parameter sets tuned to generate two new variants of the predictive engine E. An engine variant is a deployable instance of a predictive engine specified by an engine parameter set. In FIG. 8, the first variant 820 of engine E 810 is specified by engine parameter set 813, while the second variant 822 of engine E is specified by engine parameter set 814.

An exemplary value of the parameter set 813 is as follows:
Parameter Set 813 {
DataSource: x2
AlgorithmList:
   Algorithm 4:
     AlgoParam1: b1
     AlgoParam2: a2
   Algorithm 2:
     AlgoParamY: 33
}
Parameter set 813 states that variant 820 uses DataSource x2, and Algorithms 4 and 2. The values of algorithm parameter1 and algorithm parameter2 of Algorithm 4 are set to b1 and a2 respectively, while the value of the parameter Y of Algorithm 2 is set to 33.

Similarly, an exemplary value of the parameter set 814 is as follows:
Parameter Set 814 {
DataSource: x1
AlgorithmList:
   Algorithm 1:
     AlgoParam1: a1
     AlgoParam2: a2
   Algorithm 2:
     AlgoParamZ: 23
}
Parameter set 814 states that variant 820 uses DataSource x1, and Algorithms 1 and 2. The values of algorithm parameter1 and algorithm parameter2 of Algorithm 1 are set to a1 and a2, while the value of the parameter Z of Algorithm 2 is set to 23.

In various embodiments of the present invention, the evaluation and tuning process may start at either deployment platform 812 or user application 880. For example, after deployment platform 812 deploys engine variant 820 and engine variant 822, user application 880 may send three queries Q1, Q2, and Q3 (882) to PredictionIO platform 805. In some embodiments, a query may include identifying information including user ID, product ID, time, and location. A split test controller 860 determines which deployed variant each query is transferred to. In some embodiments, a single query may be transferred to more than one deployed engine variants. In this example, queries Q1 and Q3 (821) are passed to first variant 820, while query Q3 (823) is passed to second variant 822. Deployed engine variant 820 then generates predicted results 824 including predicted result P1 with replay ID X, and predicted result P3 with replay ID Z. Replay IDs in this example are alphanumeric tracking tags specific to individual queries. Similarly, deployed engine variant 822 generates predicted results 825 including predicted result P2 with replay ID Y. Predicted results 824 and 825 are then passed back to split test controller 860, to be exported as output 886 to user application 880. In embodiments where more than one user applications are present, the split test controller may track which user application a particular query has been generated from, and corresponding predicted results should be transferred to. In some embodiments, predicted results may be served to user applications other than the one where queries have been generated.

In addition to passing predicted results to the split test controller, each deployed engine variant 820 and 822 also passes data 815 and 884 to datastore 830 in this example shown in FIG. 8. Data 815 include two sets of tracking data, one specified by replay ID X and one specified by replay ID Z. The first set of tracking data specified by replay ID X includes query Q1, predicted result P1, and a description of engine variant V1. This description of engine variant V1 may be engine parameter set 813 itself, or some meta-data that uniquely identifies engine parameter set 813 to event datastore 830. Similarly, the second set of tracking data specified by replay ID Z includes query Q1, predicted result P1, and a description of engine variant V1. Data 884 include a single set of tracking data specified by replay ID Y, and are comprised of query Q2, predicted result P2, and a description of engine variant V2.

In this embodiment, at user application 880, user actions and/or behaviors collected subsequent to receiving predicted results P1, P2, and P3 (886) from the PredictionIO platform 805 are considered as actual results A1, A2, and A3 (884) respectively, and tagged with corresponding Replay IDs. Such user actions may be collected in real-time, or over a given time span such as a few hours, a day, or a week. Recall that each query evokes a prediction process to generate a predicted result, and each query is uniquely identified by a replay ID. Hence, multiple user actions or actual results corresponding to a particular query with a given replay ID may be tagged with the same replay ID. For example, actual result A1 shown in FIG. 8 may represent a sequence of user clicks and browsed product pages, all corresponding to query Q1, product recommendation P1 and replay ID X.

After actual results 884 are transferred to datastore 830, engine variant parameter sets, queries, predicted results, and actual results corresponding to the same Replay ID are aggregated within datastore 830, using the data source (data reader) or event datastore mentioned above. Aggregated data sets 832 are sent to evaluator 840 for evaluation. In this embodiment, two metrics 842 and 844 are used within evaluator 840, individually or in combination. Evaluation results are sent to auto parameter tuning variant generator 850. Auto parameter tuning variant generator 850 functions in cooperation with evaluator 840 according to one of the processes discussed with reference to FIGS. 5A to 7B, before outputting updated engine parameter sets 852 that specify two new variants V3 and V4 for Engine E. The newly generated engine variants may be subsequently deployed by deployment platform 812. The cycle of prediction, evaluation, and auto parameter tuning continues as more user queries are imported into the system.

In some embodiments, engine variant V3 is generated based on engine variant V1 alone, and engine variant V4 is generated based on engine variant V2 alone. In some embodiments, both engine variants V3 and V4 are generated based on both engine variants V1 and V2. For example, as part of evaluator 840 or auto parameter tuning variant generator 850, variants V1 and V2 of engine E 810 may be compared according to computed metrics 842 and 844. Such pair-wise comparison may provide a better-performing engine variant, the engine parameter set of which may in turn serve as a base parameter set for generating new variants V3 and V4. In another example, more than two variants may be deployed and evaluated at the same time. Evaluator 840 may sort or rank the performances of such multiple engine variants, with pair-wise or multiple-way comparisons, before generating new engine variants for further deployment and evaluation.

In some embodiments, one or more new engine variants may be determined manually by an operator. For example, the operator may examine evaluation results output by evaluator 840, and manually input a new set of engine parameters as new engine variant V3. In another example, the operator may directly modify the output of auto parameter tuning variant generator 850.

In addition to auto parameter turning, a developer of the predictive engine E or an operator of the replay loop as shown in FIG. 8 may prefer to examine prediction history to tune engine parameter sets directly and to troubleshoot issues in predictive engine design. For example, Prediction platform 805 may include an interface or a hook to such an interface for users or operators to provide actual results directly. PredictionIO platform 805 may also allow operators to tag debug information, so each prediction will have debug information that can be examined using a Replay feature as will be discussed next. Visual replay 890 may replay tracking data from data store 830 and available debug information to operators, thus providing insights into the selection and tuning of data sources, algorithms, algorithm parameters, as well as other engine parameters that may affect the performance of a predictive engine. Such extensive replay of prediction history allows operators to understand and deduce why particular prediction results are generated and how prediction performances can be improved.

Replay Examples

The present invention allows users to replay prediction scenarios to analyze, visualize and detect the change of prediction accuracy over various segmentations, such as time. Take the following three types of prediction problems as examples, shown in Table 1.

TABLE 1

Replay Examples

| | Query | Predicted Result | Actual Result (or user actual action) |
|---|---|---|---|
| 1 | Text | Suggestion | Complaint |
| 2 | <P1, P2, P3> | <P10, P11> | <P10, P20> |
| 3 | <user id> | <P10, P11> | <P10, P20> |

The examples shown in Table 1 correspond to:
1. Classification. Given a document of text body, predict it's a suggestion or complaint.
2. Similar item recommendation. Given a list of items, predict which other ones are similar to them.
3. Personalized recommendation. Given a user id, predict which items the users will incline to take actions on.

The Replay will allow operators to visualize the predicted results with actual results during the evaluation phase.

Replay for Performance Analysis and Monitoring

As prediction history and tracking data are collected and stored, prediction scenarios may be replayed and the complete prediction history of each user that queries the system may be reconstructed, allowing operators of the replay process to analyze, visualize, and detect changes of prediction accuracy over various segmentations, such as different time periods. Recall from the discussion of evaluator 450 in FIG. 4 that actual results such as actual user behaviors may be received from a datastore or a user application during the evaluation phase. Such actual results may be visualized with predicted results through visual replay 890 for comparative purposes. Given a particular replay ID, visual replay 890 may retrieve and selectively display associated query, predicted result, actual result, additional auxiliary user information or meta-data, and possibly the corresponding engine variant as given by the engine parameter set. In some embodiments, a selected subset of tracking data may be visually displayed, where the subset is pre-defined or manually configured by an operator of visual replay 890. Patterns, anomalies, and trends in tracking data may thus be analyzed by the system or by the operator directly. A replay of prediction history or engine performance may or may not be followed by further engine parameter tuning processes.

As the cycle of prediction, evaluation, and auto parameter tuning takes place, visual replay 890 may function as a task monitor, allowing the operator to selectively and incrementally view tracking data thus collected. In some embodiments, operators can be notified when user conversion (decision to purchase) drops below a certain predefined threshold for a particular engine or engine variant. The operator can then utilize the replay feature of the PredictionIO platform for troubleshooting and continuous prediction performance monitoring.

Figure 9:
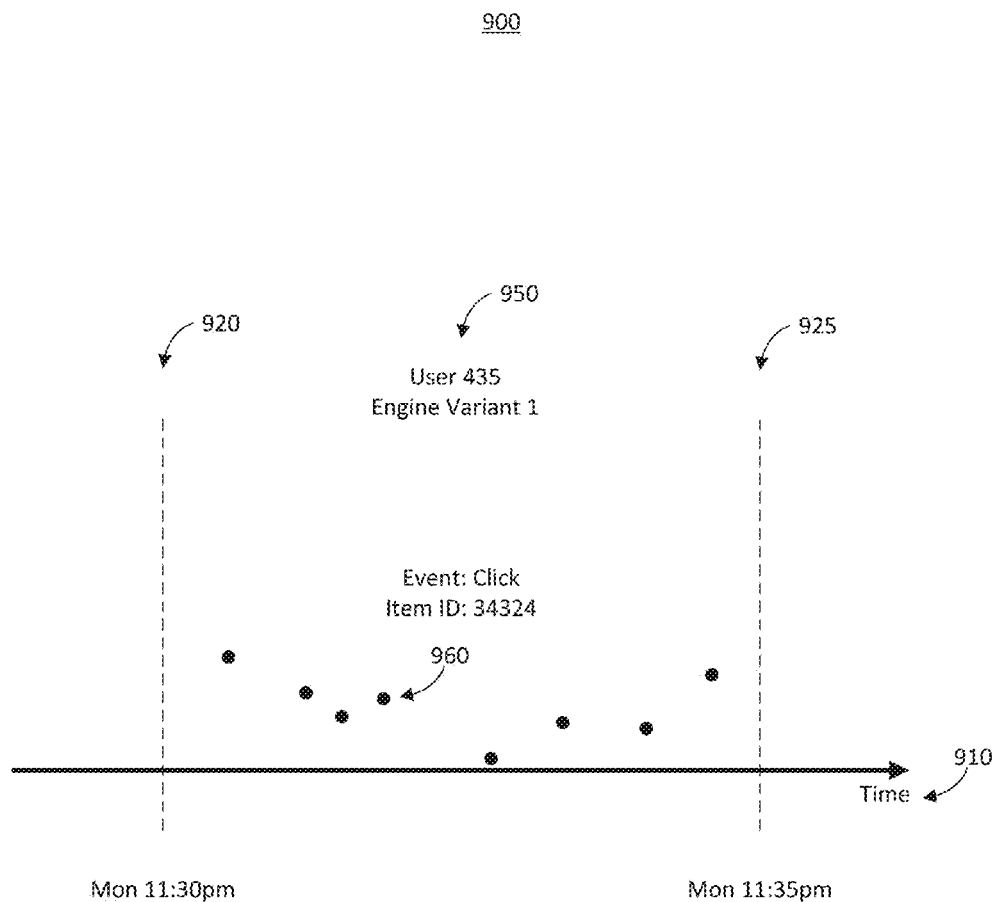
FIG. 9 is an illustrative graph of actual user actions recorded over a given time period, according to one embodiment of the present invention.

FIG. 9 is an exemplary graph 900 of actual results, in this case, actual user actions recorded over a given time period, according to one embodiment of the present invention. In this particular visualization example, user actions are plotted between a starting time 920 at 11:30 pm on a given Monday and an end time 925 at 11:30 pm on the given Monday. Each data point on the plot represents a particular user action or event that occurred after a target prediction has been made in response to a user query with a replay ID. Tracking data 950 are displayed on the graph to show that the plotted actual user actions are taken by user 435, after an engine variant 1 has been employed to make predictions. Alternatively, a replay ID or the engine parameter set may be displayed. In some embodiments, the replay ID may comprise the displayed user ID, engine variant, and a given time span. In other words, visual replay of tracking data may be based on user segments. In this particular example, tracking data 960 are displayed next to a data point to indicate that a click event has been detected and assigned an item ID of 34324.

In this example, actual user actions over a five-minute time period of segmentation are plotted. In some embodiments, actual results or other types of tracking data may be plotted over shorter or longer time segmentations. In some embodiments, tracking data associated with multiple users, multiple queries, or multiple replay IDs are plotted on the same graph. Moreover, data may be grouped by cohort, session, and other types of data characteristics. The PredictionIO platform may automatically detect patterns in tracking data, and cluster them accordingly. On the other hand, operators may also specify desired groupings directly. For example, operators can select a specific user and session, and see all the events associated with the user or session.

In addition to displaying tracking data directly, the PredictionIO platform may produce detailed reports on prediction histories, enabling the further fine tuning of prediction engines.

Figure 10:
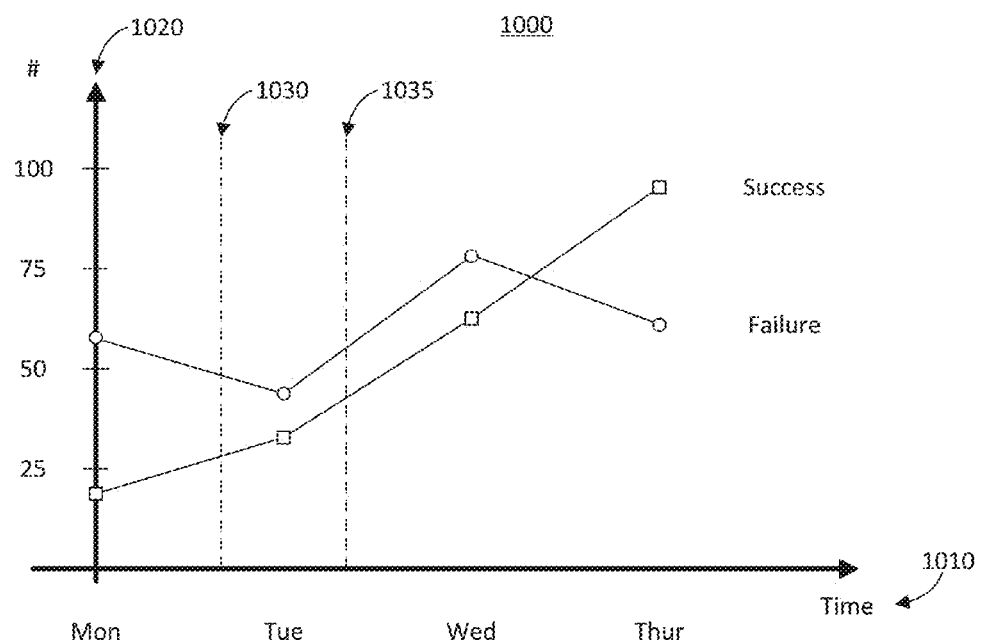
FIG. 10 is one illustrative plot showing how reports of prediction results may be viewed graphically, according to one illustrative embodiment of the invention.
Figure 11:
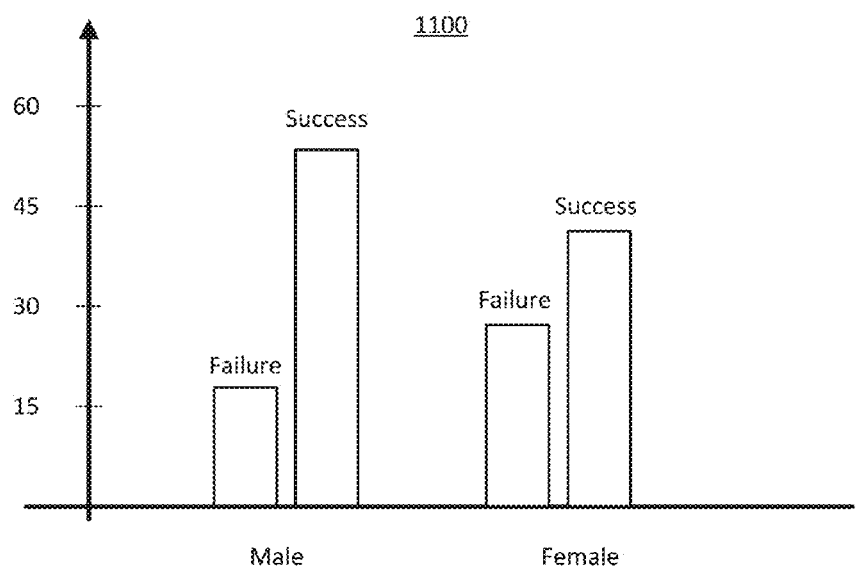
FIG. 11 is another illustrative plot showing how reports of prediction results may be viewed graphically, according to another illustrative embodiment of the invention.

FIGS. 10 and 11 are two illustrative plots showing how reports of prediction results may be viewed graphically, according to illustrative embodiments of the present invention. FIG. 10 shows the number of prediction successes and failures over a four-day time-span. In this example, the horizontal time axis 1010 is divided into individual days, while the vertical axis 1020 represents the number of occurrences. The piecewise-linear success and failure curves may refer to a particular engine variant, or all variants of a particular prediction engine. In some embodiments, vertical axis 1020 may be set in a percentage scale or a log scale. In addition to graphical representations, this report of prediction results may alternatively be generated as a table.

An operator of the replay process may further zoom in and out of a certain time period such as a single day, as indicated by lines 1030 and 1035, to examine additional details and to further troubleshoot issues in predictive engine design and engine parameter tuning. Although only four data points are show for each time-series data curve shown in FIG. 10, in some embodiments, number of prediction successes and failures may be statistically summarized over strategically generated samples and time-spans. The PredictionIO platform may provide default values for the time scale. In some embodiments, the PredictionIO platform may take into account the amount of data available to dynamically determine optimal time scale values for binning purposes. In yet some other embodiments, the PredictionIO platform may further generate and display linear or non-linear regression curves to model the observed tracking data. The "Success" and "Failure" metrics shown here are two examples of statistics useful for analyzing prediction performances. Operators may define additional metrics such as success rates and confidence statistics, and more than two metrics may be provided in a report, and shown graphically in a visualization.

As previously discussed, data may be grouped by cohort, session, and other types of data characteristics in generating useful statistics for analyzing prediction results. FIG. 11 is a bar chart of prediction successes and failures plotted against different genders. By considering different genders separately, it becomes clear that the current engine or engine variant under consideration is more tailored for female users instead of male users. Consequently, an operator or developer may decide to include gender as an additional variable in the predictive model. In some embodiments, other types of charts such as histograms and scatter plots may be displayed.

Data Augmentation

In FIG. 11, success and failure metrics are plotted against different genders. In some embodiments, the PredictionIO platform provides a data augmentation feature for augmenting available user data with additional information such as gender. For example, external information to be augmented may include ZIP code, age group, ethnicity, occupation, and family size. Additional information to be augmented may also be mined from behavior data. For example, users may be classified into high-spending and low-spending groups, or frequent on-line shopping or non-frequent on-line shopping groups. Data augmentation provides new ways of categorizing tracking data for better performance monitoring and analysis.

Support for Multiple Experiments

Figure 12:
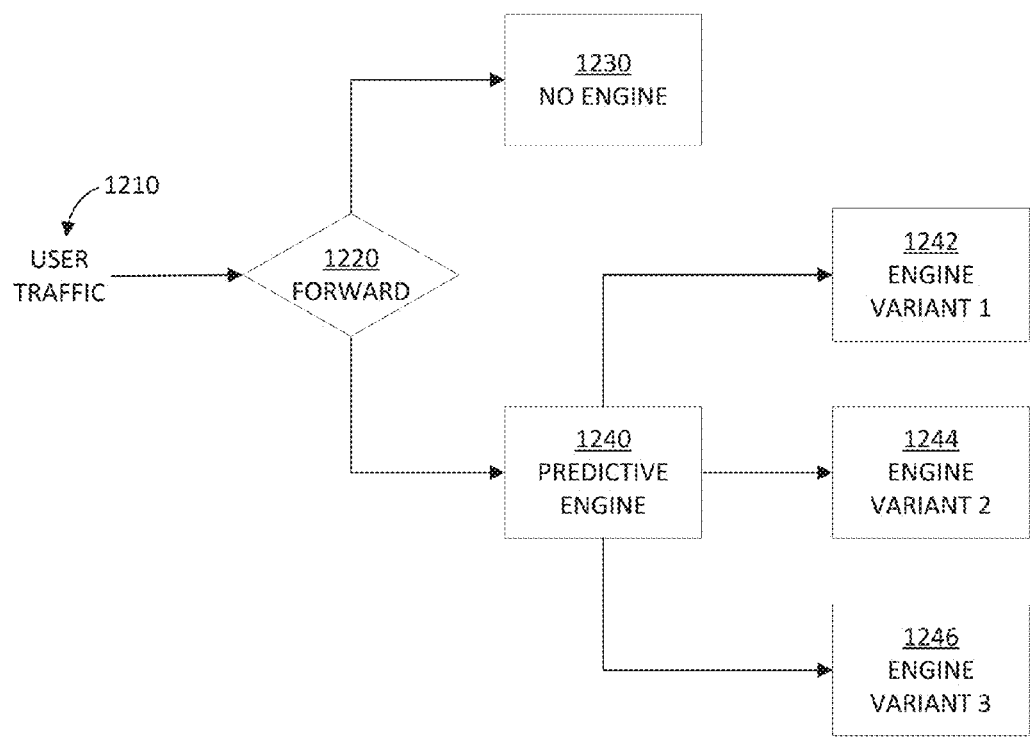
FIG. 12 shows an illustrative system diagram for testing multiple engine variants at the same time, according to one embodiment of the present invention.

Recall from the discussion with reference to FIG. 8, that multiple engine variants may be tested and studied at the same time, with a split test controller determining which engine variant a user query is dispatched to. Similarly, FIG. 12 shows a system 1200 for testing multiple engine variants at the same time, according to an illustrative embodiment of the present invention.

In system 1200, input user traffic 1210 may be allocated dynamically through forward 1220, based on the performance of each engine variant under consideration. For example, initially, half of new user traffic or queries 1210 may be directed to the predictive engine 1240, while the remaining half are simply stored and thus not directed to a predictive engine, as indicated by the No Engine placeholder 1230. In some embodiments, forward 1220 is a split test controller similar to component 860 shown in FIG. 8. Predictive traffic through predictive engine 1240 may be equally shared among its three variants 1242, 1244, and 1246. Thus each engine variant takes on one-sixth of the overall user traffic. Overtime, it may be determined that a specific variant such as engine variant 1242 provides higher prediction accuracy. As a result, forward 1220 may automatically direct more than one-sixth of overall traffic to engine variant 1242 to optimize overall system performance. The PredictionIO platform seeks to strike a balance between exploration and exploitation. In yet some other embodiments, forward 1220 may direct the same predictive traffic to multiple engine variants, thus enabling direct comparison of prediction results and prediction accuracy across the multiple engine variants.

In some embodiments, a PredictionIO platform may deploy multiple engine variants with initial sets of engine parameters or initial engine parameter settings. The deployed engine variants then receive queries, as allocated by a splitter, and respond with predicted results. Corresponding actual results are also received. Evaluation results are then generated and the current engine parameter sets and evaluation results are passed to an engine parameter generator. From time to time, the engine parameter generator generates one or more new parameter sets based on evaluation results of the current variants, and sometimes, evaluation results of some or all previously deployed variants. Such previously deployed variants may have been replaced by previously generated new engine parameter sets, and evaluation results of previously deployed variants may have been stored by the PredictionIO platform. The one or more new engine parameter sets generated in the current round may then be deployed to replace the existing engine variants.

In yet other embodiments, a PredictionIO platform may perform evaluation, tuning, and/or comparison of multiple engines. For example, multiple engines may be implemented by different developers and data scientists for a particular prediction problem such as classification of incoming mail as spam or non-spam, or recommendation of similar items. A PredictionIO platform may provide, to externally or internally implemented predictive engines, engine evaluation, engine parameter set tuning, prediction history tracking, and replay services as discussed throughout the current disclosure. For multiple engines targeting the same prediction problem, the PredictionIO platform may serve as an interface for cross-comparison and engine selection. For multiple engines targeting different prediction problems based on queries from the same user, PredictionIO platform may serve as an interface for cross-examination, selection, and aggregation.

Visual Replay

In addition to illustrative plots shown in FIGS. 9, 10, and 11, FIGS. 13-18 provide illustrative visual displays of prediction performances over one or more replay groups. A replay group refers to a pre-defined or operator-defined segment of queries that satisfy one or more conditions as provided through query segment filters. Replay groups may be created for textual or visual displays. Examples of query segment filters include engine variant filters, user attribute filters, item attribute filters, query attribute filters, and other property filters or conditional filters capable of selecting a subset of available queries for performance analysis and monitoring. For example, an engine variant filter may select queries that have been, or will be processed through a given engine variant, and a single query may be assigned to multiple replay groups if it has been or will be processed through multiple engine variants; a user attribute filter may be applied if queries contain at least a user, and may be used to select queries associated with users in a particular age group; an item attribute filter may be applied if queries contain at least an item; and an query time attribute filter may be applied if queries have associated timestamps. Multiple query segment filters may be used jointly, and filtered results may be combined as intersections or unions of query segments. Query segment filters may be pre-defined or operator-defined, and may be applied automatically or upon request by an operator. In addition, since query segment filters select subsets of queries without necessarily affecting the prediction process, they may be applied during any stage of the predictive engine tuning, evaluation, and replay process. In one example, a query segment filter may be applied to a query as the query is received from an end-user device, before the prediction process takes place. In another example, a query segment filter may be applied to stored queries or query records after predictions have been made already. Each query may be associated with one or more replay group IDs as query segment filters are applied.

As a more specific example, a recommendation engine may be deployed as an Engine Variant e_v_100, with an initial or default engine parameter set. A query to ask this engine to recommend five products to a user 123 when the user is in San Francisco may look like [userid=123, city=SF, num=5]. Since userid refers to a user, a filter of a new replay group for Engine Variant e_v_100 may have user attribute options. User attributes can be anything that the system has stored about users. For instance, age, gender, sign up date, plan or service a user has signed-up for, range of user ids, dates, and so on. If the system contains users' behavior data, the filter can even go further to select queries that have targeted users who have performed certain actions during a certain time range. For example, one or more filters may be applied to generate a replay group by selecting queries for recommending five products to female users when they are in San Francisco.

Figure 13:
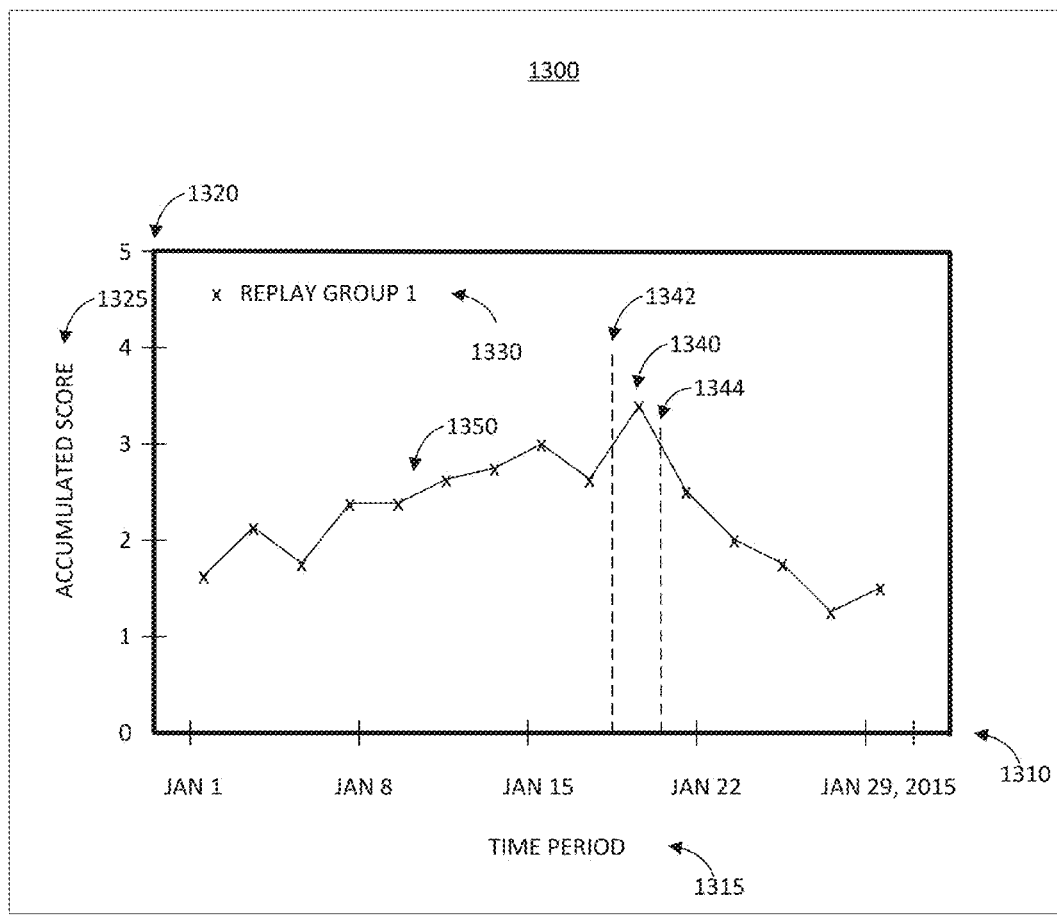
FIG. 13 shows an illustrative visual display of prediction performances of a predictive engine over a replay group, according to one embodiment of the present invention.

FIG. 13 shows an illustrative visual display of prediction performances of a predictive engine over a replay group, according to one embodiment of the present invention. In this example, performance of the prediction process evoked in response to a given query is quantified, or quantitatively represented, by a prediction score. A prediction score may be calculated by at least one pre-defined or operator-defined score function based on the predicted result(s) and actual result(s) associated with the query. Generally, the deployed engine variant, derived predicted results, actual results, and corresponding computed prediction scores are all associated with the replay ID specific to the given query. In some embodiments, the prediction score is computed by evoking a score function using a score_junction(PredictedResult, ActualResult) command. A score function may also take on additional inputs that further configure the score computation process. Different score functions may be provided by a PredictionIO platform. In some embodiments, an operator may define multiple score functions and each replay group may have more than one set of prediction scores.

Depending on how such score functions are defined, computed prediction scores may take on both positive and negative values in some embodiments, but be non-negative in some other embodiments. Computed prediction scores may also be normalized, and may take on continuous or discrete values. For example, consider an input predicted result containing two items, such as (P10, P11), and an input actual result also containing two items. In some embodiments, a score function may return a value of 1 if the input actual result is exactly the same, i.e., (P10, P11), and 0 otherwise. In some embodiments, a score function may return a score of 0, 1, or 2, depending on the number of overlapping items from the predicted result and the actual result. Such a score may also be normalized to 0, 0.5, or 1, representing the percentage of correctly predicted items.

In this and subsequent illustrative examples shown in FIGS. 13 to 18, prediction performances are plotted in terms of accumulated prediction scores over time. Here an accumulated prediction score is calculated by an accumulation function that summarizes the prediction scores of all queries of a replay group within defined time intervals over a given time period. For example, each query may have an associated timestamp, representing the time at which the query was received by the predictive engine. According to such timestamps, queries within a replay group may be segmented for computing accumulated prediction scores. In another example, a timestamp may represent when a prediction has been made, or a sign-up date/time at which a user has signed-up for prediction service. Generally, computation of accumulated predicted scores may be carried out over any categorization or segmentation of queries within a replay group. Furthermore, when multiple score functions are defined, multiple accumulated scores may be displayed on the same visualization chart or on separate charts.

FIG. 13 shows an illustrative visual chart 1300 of prediction scores accumulated over two-day intervals during the month of January, 2015 for a Replay Group 1. Data points have been connected to generate a piecewise-linear curve 1350. The horizontal axis 1310 with label 1315 shows the time period of interest, between Jan. 1, 2015 inclusive, and Jan. 31, 2015 exclusive. In some embodiments, this time period of interest may cover one or more specific dates, consecutive or non-consecutive, or a range of dates. The vertical axis 1320 with label 1325 refers to accumulated prediction scores. Recall that each query may have a timestamp indicating the time and/or date at which the query has been received or when a prediction has been made by a PredictionIO Platform in response to the query. Although not shown explicitly here, Replay Group 1 may have been obtained through a query segment filter that selects all queries with timestamps within January, 2015. In FIG. 13, data point 1340 is the prediction score accumulated over all queries with a timestamp between time 1342 (Jan. 19, 2015) inclusive, and time 1344 (Jan. 21, 2015) exclusive. Time intervals such as the one between time 1342 and time 1344 represent how the system groups queries together over the whole time period of January, 2015. In a similar example, queries may be grouped into one-day intervals over a four-day period, and the prediction score may be defined to take on the value of 1 or 0 depending on whether an input prediction result is the same as an input actual result. The resulting plot of accumulated scores would then be similar to the success curve shown in FIG. 10.

An operator of the replay process may zoom in and out of the time period shown in FIG. 13, to examine additional details in the prediction performance visualization, thus further troubleshoot issues in predictive engine design. For example, although prediction scores are accumulated over two-day intervals during a single month in FIG. 13, in some embodiments, the system may allow an operator to manually configure the time interval(s) and time period for plotting. The PredictionIO platform may also take into account the amount of data available to dynamically determine optimal time intervals for prediction score accumulation and visualization.

In some other embodiments, Replay Group 1 may be generated by selecting queries containing users who have signed up for prediction service during January, 2015. Generally, the time period 1315 may refer to any time-related query attribute. In other embodiments, prediction scores may be accumulated over different categories such as user gender, leading to accumulated score plots similar to the diagram shown in FIG. 11. Moreover, although accumulation has referred to a direct summarization operation in generating the plot shown in FIG. 13, in some embodiments, accumulation may refer to other algebraic or statistical operations such as averaging, weighed summation, and such. A direct summation operation is a weighed summation with weights equal to 1. An averaging operation is a weighed summation with weights equal to the reciprocal of the number of queries. A statistical sampling process followed by direct summation may be considered as a weighed summation with weights equal to 1 or 0. Non-linear weighing is also possible in some embodiments of the present invention.

Figure 14:
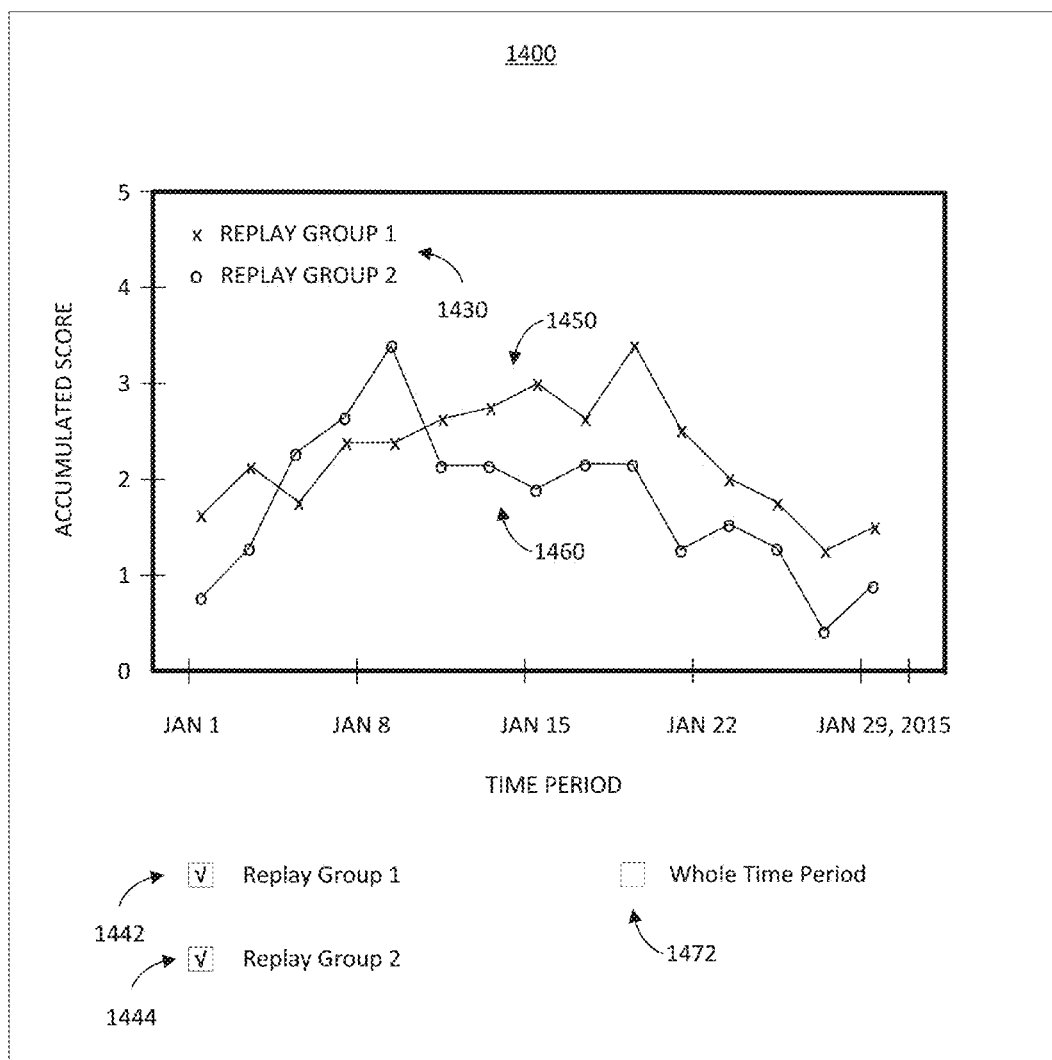
FIG. 14 shows an illustrative visual display of prediction performances over two replay groups, according to one embodiment of the present invention.

In FIG. 13, only a single replay group has been visualized as curve 1350 and labeled by legend 1330. FIG. 14 shows an illustrative visual display 1400 of prediction performances over two replay groups, according to one embodiment of the present invention. In addition to Replay Group 1 as represented by the curve 1450, accumulated scores for queries within Replay group 2 is visualized as curve 1460. Both replay groups are labeled by legend 1430. In addition, visual display 1400 includes three checkboxes 1442, 1444, and 1472, placed below the plotting window. Checking and un-checking boxes 1442 and 1444 turn the display of curves 1450 and 1460 on and off respectively. Box 1472 provides a "Whole Period" option, which sets the time interval for prediction score accumulation to the entire time period of interest. Checking box 1472 turns each of curves 1450 and 1460 into a single data point. In other words, under the whole period option, all queries within the time period of the chart would be summarized to generate a single accumulated prediction score.

Figure 15:
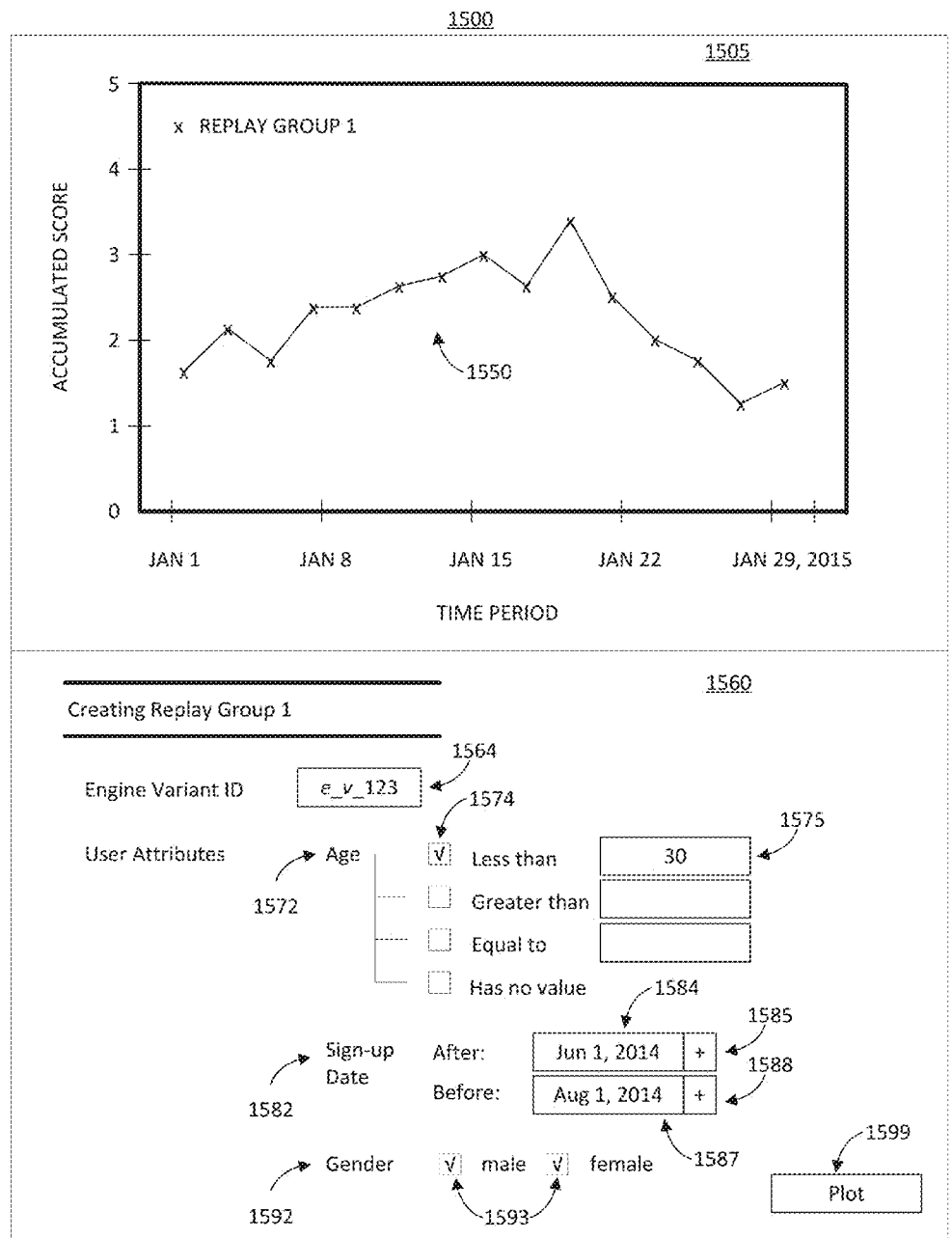
FIG. 15 shows an illustrative visual display of prediction performances over a replay group created using query segment filters, according to one embodiment of the present invention.

FIG. 15 shows an illustrative visual display 1500 of prediction performances over a replay group created using query segment filters, according to one embodiment of the present invention. In this embodiment, the visual display 1500 is divided into two windows, plotting window 1505 for visualizing accumulated prediction scores, and interactive display 1560 that allows an operator to create Replay Group 1 dynamically for generating curve 1550. Upon initialization, fields in interactive display 1560 may take on default values, which may be pre-defined or may be automatically calculated by the system. Given a deployed engine variant, box or field 1564 allows an operator to assign a name to the engine variant for easy identification. Labels 1572, 1582, and 1592 indicate user attributes that can be set by the operator. Such user attributes may be pre-defined or operator-defined. In addition, the PredictionIO platform may assess all available queries to determine if users are present, and if so, which user attributes are present and can be selected for generating replay groups. In this particular example, age, sign-up date, and gender are three available user attributes. Checkboxes 1574 allow the operator to determine a user age group. In this example, accumulated scores are generated based on users in the below-30 age group, as indicated by value 30 in field 1575. Boxes 1584 and 1587 allow the operator to select users who have signed-up during a particular time period, for example, after Jun. 1, 2014, but before Aug. 1, 2014. Pull-down menus may be activated through buttons 1585 and 1588 to select dates form a calendar. In addition, checkboxes 1593 allow the operator to select both male and female users.

Once user attributes have been input by the operator, Replay Group 1 may be updated automatically, and accumulated prediction scores may be visualized in plotting window 1505. Alternatively, a request for updating the replay group and the corresponding accumulated prediction score visualization may be received by the system when the operator clicks on the "Plot" button 1599.

In some embodiments, operators can create as many replay groups on a visual chart as they like. Each replay group may be created through interfaces similar to interactive display 1560, or may be loaded from storage. Operators can assign a name label to each replay group for easy identification, and can use different colors or symbols for each replay group.

Figure 16:
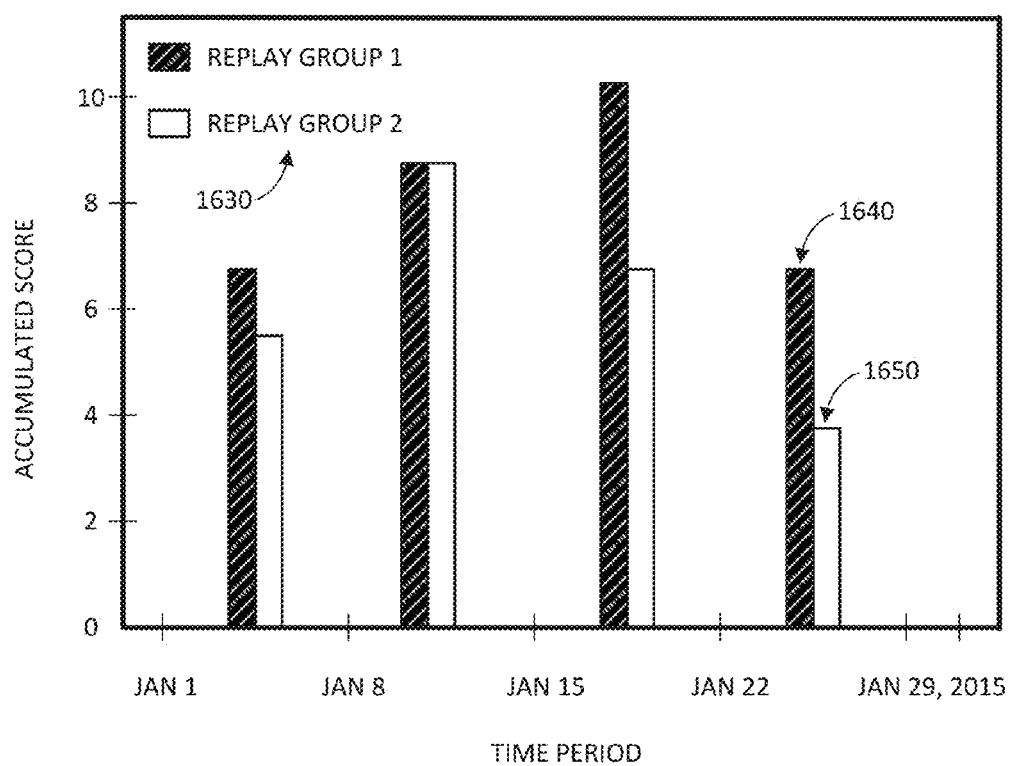
FIG. 16 shows an illustrative histogram representing prediction performances over two replay groups, according to one embodiment of the present invention.

In some embodiments, accumulated prediction scores of one or more replay groups within the time period of interest can be displayed on the visual chart through different graphical representations such as line plots, histograms, bar charts, and scatter plots. For example, FIG. 16 shows an illustrative histogram 1600 representing prediction performances over two replay groups, according to one embodiment of the present invention. The same Replay Groups 1 and 2 from FIG. 14 are shown here. Each bar, such as bars 1640 and 1650, corresponds to prediction scores accumulated over one-week intervals during the one-month period of January, 2015.

Although not shown explicitly in FIGS. 13-16, in some embodiments, an operator may manually adjust the values of the time period and time interval, as well as definitions for the score function and accumulation function. The visual chart may be updated automatically once these values are changed, or upon request when such requests are received from the operator.

Figure 17:
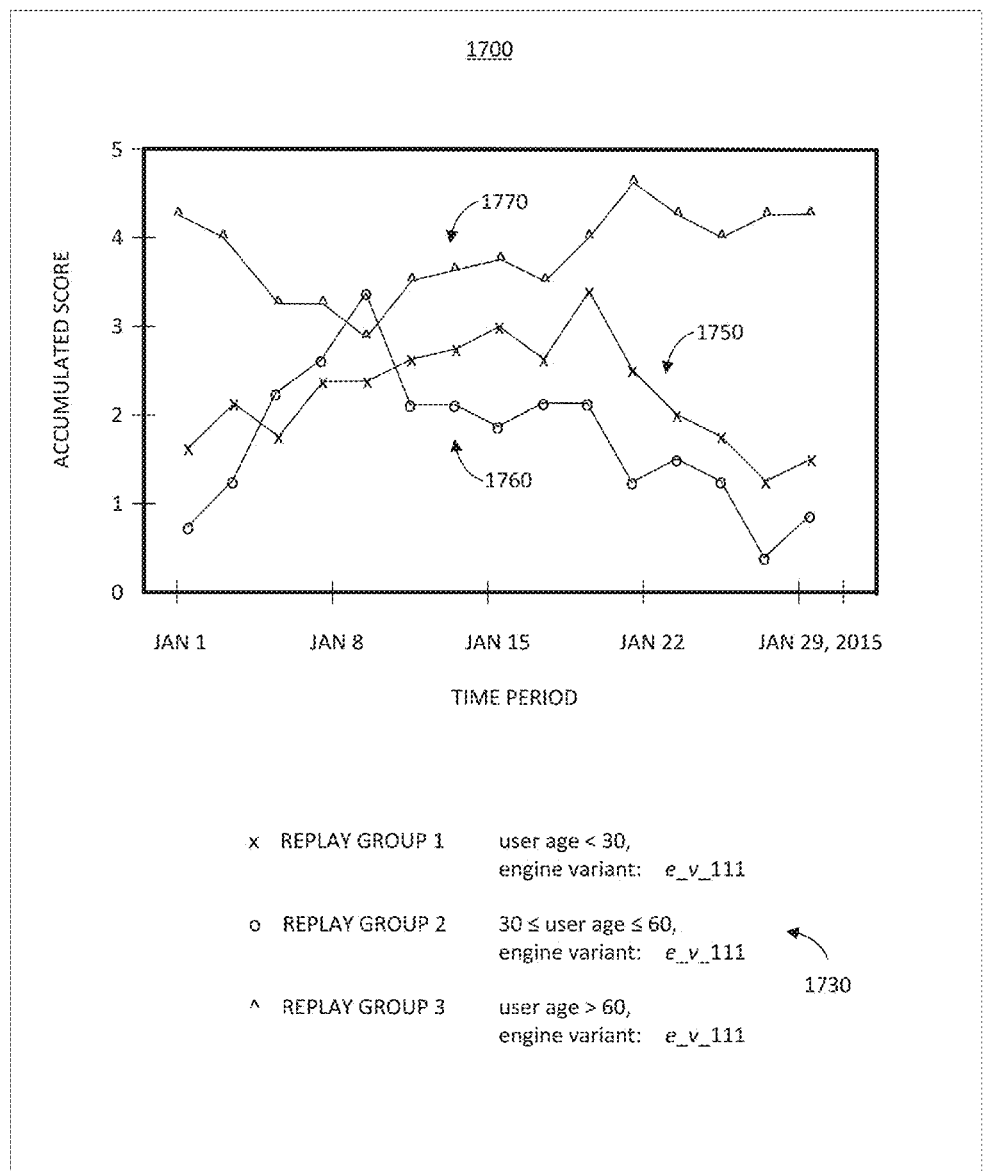
FIG. 17 shows one illustrative visual display of prediction performances over multiple replay groups, according to one embodiment of the present invention.
Figure 18:
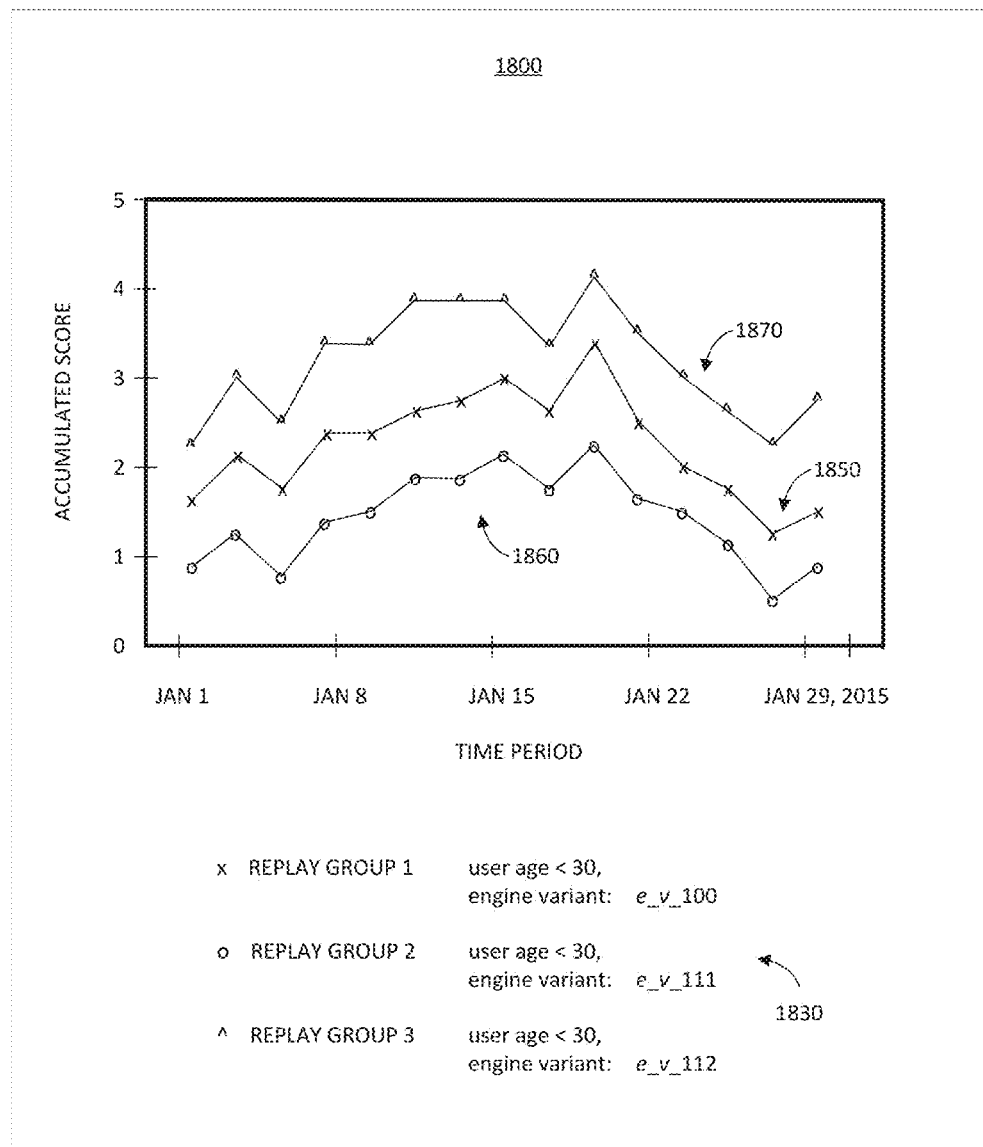
FIG. 18 shows another illustrative visual display of prediction performances over multiple replay groups, according to one embodiment of the present invention.

In addition, FIGS. 17 and 18 show illustrative visual displays of prediction performances over multiple replay groups, according to embodiments of the present invention. In FIG. 17, visualization 1700 shows how well one engine variant performs over a given one-month period for three different user segments divided by age groups. Curves 1750, 1760, and 1770 correspond to Replay Groups 1, 2, and 3 respectively, as indicated by legend 1730. Queries are divided into below-30, 30-to-60, and above-60 age groups, and queries within each replay group are processed through engine variant e_v_111. In some embodiments, Replay Groups 1, 2, and 3 are generated by applying a user attribute filter that examines the user age attribute. All queries within each replay group are processed through engine variant e_v_111, either before or after the user attribute filter is applied.

In FIG. 18, visualization 1800 compares how three engine variants perform over a given one-month period for the below-30 age group. Curves 1850, 1860, and 1870 correspond to Replay groups 1, 2, and 3 respectively, as indicated by legend 1830. In some embodiments, Replay Groups 1, 2, and 3 are obtained by applying a user attribute filter as well as an engine variant filter. Once a query is processed by an engine variant to generate a corresponding predicted result, the query may include the engine variant information as part of the resulting query record. A query record may include the input query, engine variant information, predicted results, actual results, prediction score, and/or any other information relevant to the input query and how the input query has been processed by the prediction system. Thus, a single input query to a predictive engine may lead to multiple query records; and query records corresponding to the same input query may be segmented into different replay groups. An input query may also be associated with multiple replay group IDs, depending on how it is processed by the prediction system.

Detailed Prediction Debugging

Once visual replay of prediction performances are generated, an operator of the replay process may further zoom in and out, or mouse-over the visualization to examine additional details in the prediction process, hence further troubleshoot issues in predictive engine design. The PredictionIO platform thus provides method and systems for detailed prediction debugging.

Figure 19:
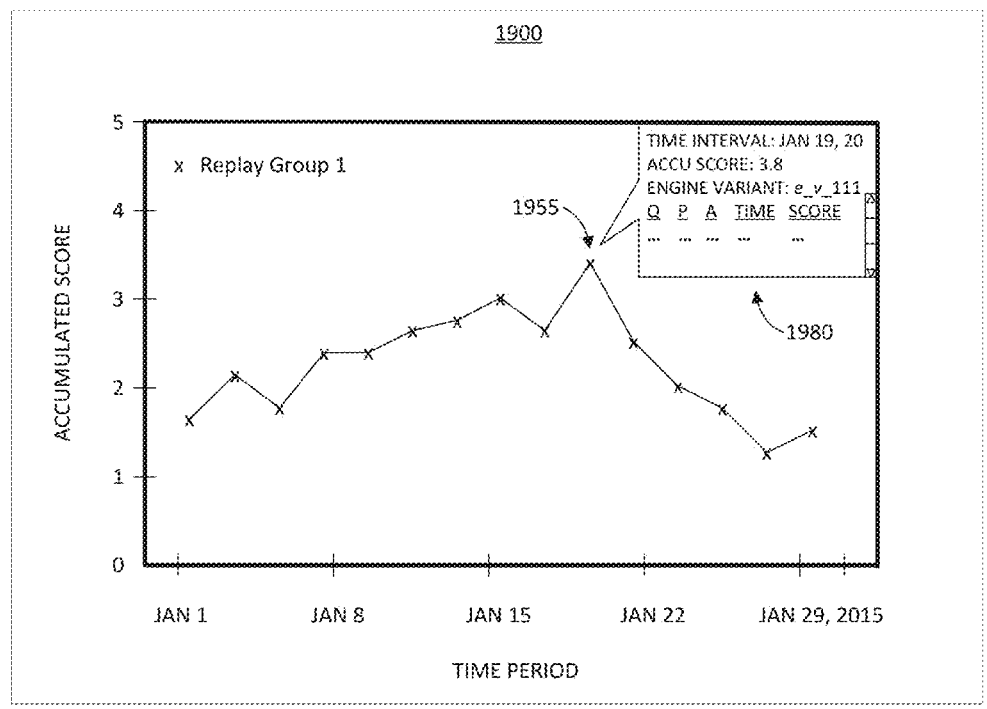
FIG. 19 shows an illustrative visual display of prediction performances over a replay group, with query records, according to one embodiment of the present invention.
Figure 19:
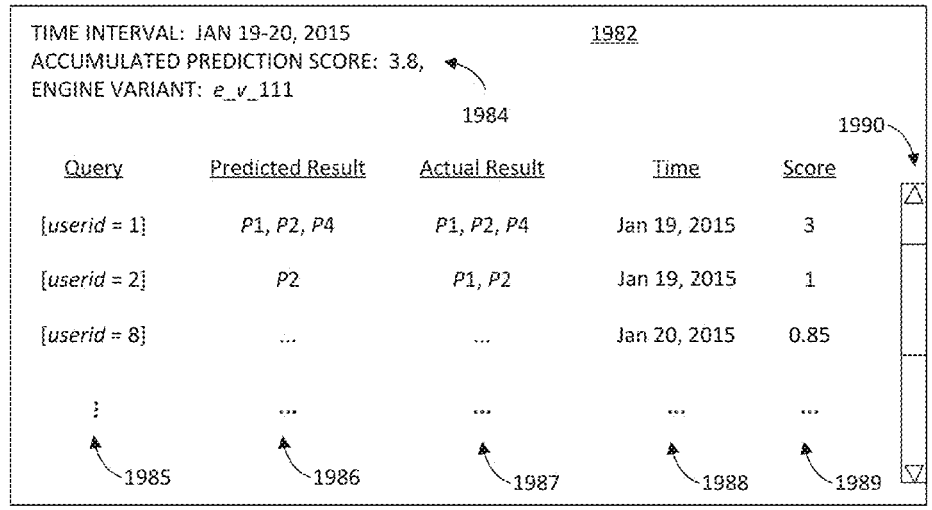

FIG. 19 shows an illustrative visual display 1900 of prediction performances over a replay group, with query records, according to one embodiment of the present invention. In this example, when the operator mouse-overs or clicks on an accumulated prediction score point such as 1955 of Replay Group 1 on the chart, a floating table 1980 is displayed, showing corresponding query records from Replay Group 1. Query records in table 1980 are involved in computing the accumulated prediction score represented by data point 1955.

Window 1982 provides a detailed and zoomed-in view of table 1980. In some embodiments, window 1982 may be displayed on its own without the floating table 1980. Label 1984 specifies the time interval and accumulated prediction score associated with data point 1955, and shows that query records displayed in this window have been processed through Engine Variant e_v_111. In this example, query records include attributes such as Query 1985 (Q), Predicted Result 1986 (P), Actual Result 1987 (A), Query Time 1988 (Time), and Prediction Score 1989 (Score). The displayed time interval and engine variant may also be part of the query records. In one specific embodiment, in which no replay ID is utilized, the system may replay based on time or other user defined condition and display the associated query records. In other embodiments, dedicated replay IDs may be assigned to each individual query or individual query record, and may or may not be displayed with other parts of the query records. A scrolling bar 1990 with up and down arrows allows the operator to scroll through query records when not enough space is available to display all query records at the same time.

Figure 20:
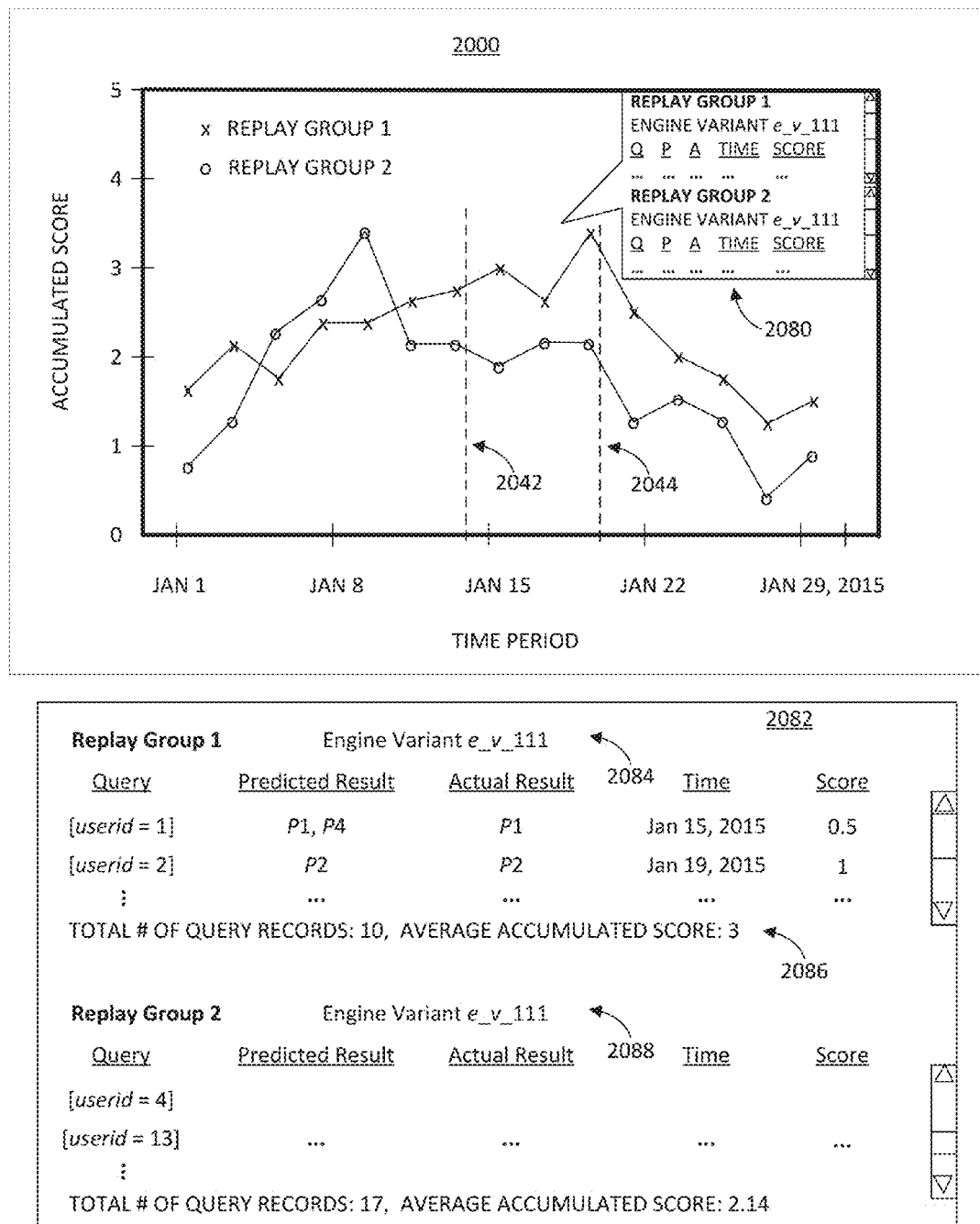
FIG. 20 shows an illustrative visual display of prediction performances over two replay groups, with query records, according to one embodiment of the present invention.

FIG. 20 shows an illustrative visual display 2000 of prediction performances over two replay groups, with query records, according to one embodiment of the present invention. When the operator selects a period of time on the chart, for example, between time 2042 and 2044, a table 2080 of query records that fall into this time period is displayed. Window 2082 is a zoomed-in view of table 2080. Displayed in this window are query records from Replay Groups 1 and 2, with attributes such as Query(Q), Predicted Results (P), Actual Results (A), Query Time (Time) and Prediction Score (Score).

In some embodiments, the system also provides statistical features to summarize the prediction performance. For example, the system may automatically select queries with outliner scores on the table. The system also provides statistical information such as mean, variance, and distribution about the scores. In FIG. 20, label 2086 provides the total number of query records and the average accumulated score across the given time period between time 2042 and 2044.

SOME EXEMPLARY EMBODIMENTS FOR ILLUSTRATIVE PURPOSES

The languages in the examples or elaborations below are context-specific embodiments, and should not be construed to limit the broader spirit of the present invention.

Building machine learning an application from scratch is hard; you need to have the ability to work with your own data and train your algorithm with it, build a layer to serve the prediction results, manage the different algorithms you are running, their evaluations, deploy your application in production, manage the dependencies with your other tools, etc.

The present invention is a Machine Learning server that addresses these concerns. It aims to be the key software stack for data analytics.

Example

Let's take a classic recommender as an example; usually predictive modeling is based on users' behaviors to predict product recommendations.

We will convert the data (in Json) into binary Avro format.
//Read training data
val trainingData=sc.textFile("trainingData.txt").map (_.split(',') match { ... })
which yields something like:
user1 purchases product1, product2
user2 purchases product2
Then build a predictive model with an algorithm:
//collaborative filtering algorithm
val model=ALS.train(trainingData, 10, 20, 0.01)
Then start using the model:
//collaborative filtering algorithm
allUsers.foreach user=>model.recommendProducts(user, 5)}
This recommends 5 products for each user.
This code will work in development environment, but wouldn't work in production because of the following problems:
1. How do you integrate with your existing data?
2. How do you unify the data from multiple sources?
3. How to deploy a scalable service that responds to dynamic prediction query?
4. How do you persist the predictive model, in a distributed environment?
5. How to make your storage layer, Spark, and the algorithms talk to each other?
6. How to prepare the data for model training?
7. How to update the model with new data, without downtime?
8. Where does the business logic get added?
9. How to make the code configurable, reusable and manageable?
10. How do we build these with separation of concern (SOC), like the web development side of things?
11. How to make things work in a real time environment?
12. How do I customize the recommender on a per-location basis? How to discard data that is out of inventory?
13. How about performing different tests on the algorithms you selected?

The Present Invention Solves these Problems

PredictionIO boasts an event server for storage, that collects data (say, from a mobile app, web, etc.) in a unified way, from multiple channels.

An operator can plug multiple engines within PredictionIO; each engine represents a type of prediction problem. Why is that important?

In a production system, you will typically use multiple engines. For example, the archetypal example of Amazon: if you bought this, recommend that. But you may also run a different algorithm on the front page for article discovery, and another one for email campaign based on what you browsed for retargeting purposes.

PredictionIO does that very well.

How to deploy a predictive model service? In a typical mobile app, the user behavior data will send user actions. Your prediction model will be trained on these, and the prediction engine will be deployed as a Web service. So now your mobile app can communicate with the engine via a REST API interface. If this was not sufficient, there are other SDKs available in different languages. The engine will return a list of results in JSON format.

PredictionIO manages the dependencies of SPARK and HBASE and the algorithms automatically. You can launch it with a one-line command.

The framework is written in Scala, to take advantage of the JVM support and is a natural fit for distributed computing. R in comparison is not so easy to scale. Also PredictionIO uses Spark, currently one of the best-distributed system framework to use, and is proven to scale in production. Algorithms are implemented via MLLib. Lastly, events are store in Apache HBase as the NoSQL storage layer.

Preparing the Data for Model Training

Preparing the data for model training is a matter of running the Event server (launched via ('pio eventserver') and interacting with it, by defining the action (i.e. change the product price), product (i.e. give a rating A for product x), product name, attribute name, all in free format.

Building the engine is made easy because PredictionIO offers templates for recommendation and classification. The engine is built on an MVC architecture, and has the following components:
1. Data source: data comes from any data source, and is preprocessed automatically into the desired format. Data is prepared and cleansed according to what the engine expects. This follows the Separation of Concerns concept.
2. Algorithms: machine learning algorithms at your disposal to do what you need; ability to combine multiple algorithms.
3. Serving layer: ability to serve results based on predictions, and add custom business logic to them.
4. Evaluator layer: ability to evaluate the performance of the prediction to compare algorithms.

Live Evaluation

PredictionIO Enterprise Edition is capable of performing live evaluation of its prediction performance. This is a lot more accurate because it is capable of tracking all subsequent actions of a user after a prediction has been presented to the user.

Architecture

PredictionIO has two types of deployable servers: event server and prediction engine server. In live evaluation mode, a prediction engine server will do the following additional actions per query:

generates a unique tracking tag for the current query;
logs the current query, predictions of the current query, and the unique tracking tag; and
presents predictions and the unique tracking tag to the user.

Subsequent actions of the user will be logged and tracked using the aforementioned unique tracking tag. This is called the "tracking data."

Replay Loop

Utilizing the above features, the present inventors built on top of it a replay loop to perform live evaluation of prediction engines with unmatched accuracy and level of details that otherwise A/B testing, or offline evaluation would not be able to provide.

PredictionIO Enterprise Edition provides a special data source (data reader) that can use the "tracking data" to replay how a prediction engine performs. This data source is able to reconstruct the complete history of each user that queried the system.

PredictionIO Enterprise Edition provides a special evaluator component that takes the complete history of each user and produce accurate and detailed reports of how each prediction performed. Besides obtaining a better picture of how the prediction engine performs in contrast to black box A/B tests, this level of detail enables fine tuning of the prediction engine by data scientists and engine developers.

Visual Replay

Visual Replay is allowed for replay loops, providing more information to the operators.

SUMMARY

The present invention helps data scientists and developers develop and deploy machine learning systems.

One embodiment provides a library/engine templates gallery so developers can build their own engines or customize templates to their own needs; ready to use right away and also customizable. All engines follow the same DASE architecture described above.

Engines are deployed as a web service, which are deployed as a service. Unifying data for predictive analytics—provide an event server to train the data. Event server can connect to existing systems, like mail servers for example. Can be installed on premises. Can also be deployed on AWS or private cloud. Because of customizability, makes sense for users to install on their own cloud.

Some Illustrative Benefits of the Present Invention

These benefits are illustrative of some advantages of the present invention over the prior art, and are not to be read as limiting, or to limit the benefits of the present invention to those listed. Other benefits may also exist.

1) Differentiation Between Engine and Algorithm
  a. Focus on engine, not algorithm. When doing evaluation, not just evaluating the algorithm, also evaluating the data sources. And business logic parameters.
  b. Engine level comparison, versus algorithm parameter tuning based on algorithm.
  c. Not just tuning parameters of an algorithm, versus parameters of an engine.
  d. Engine parameter takes into account business logic, not just prediction accuracy of a single algorithm.
  e. Can deploy multiple variants of engines, with different algorithms.
  f. The variants are chosen by the user, based on a template provided by PredictionIO, and may also be automatically generated.
  g. The template gives the engine parameters that the user can tune with the default setting. The parameter generator deploys the variants. For example, engine.json contains a list of parameters that an operator can tune.

2) Time Horizon
  a. Time horizon on replay is much different from advertising real-time.
  b. All lifecycle is done in prediction.
  c. Real-time environment.
  d. In the replay, it can take into account a longer time horizon of user actions.

3) User response versus any event, such as immediate events, or delayed, or multiple.
  a. When did the user click? Might not purchase or click, but can keep track of how the user behaves, and all of the actions the user does on the page.
  b. Sequence of actions—for example, user might not click on 5 products, but buy a product later.

4) Query is Generic
  a. Predicted results is generic, versus in advertisement, which is specific.
  b. Tracking can track how good the predictive result is.
  c. Actual consequence or conversion doesn't necessarily matter.

5) Replay
  a. Replay means the whole situation is replayed. Not simply is the result positive or negative, but what will users do with the predictions?
  b. Replay serves the purpose of a debugger of engine performance.
  c. Problem is in AB testing scenario, one can only tell if variant 1 performs better than variant 2. But in debugger/replay, why does variant 1 do better than variant 2 can be answered and determined by the operators. For example, the operator can replay a scenario, and understand the behavior of that particular engine variant.
  d. Can replay why the engine is giving a bad, or a good recommendation, and then find out why.

6) Replay Advantages
  a. Visual elements in visual replay are graphical and/or textual, giving more insight.
  b. User interactions.
  c. How to tune the engine? Algorithm?
  d. Evaluation and tuning.
  e. Can change the scenario based on replay results. For example, can change the email header, and replay how the results would perform for that engine variant.
  f. Support both types of predictions—off-line and live evaluation. Both are off-line in one sense, but one kind (off-line) can be simulated. One type (live evaluation) effects causality. In one type of prediction (live evaluation), you show something to the user, which affects the outcome of the user. The other type of prediction (off-line), doesn't affect the user.

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, programs, codes, libraries, objects, modules, etc. indicated collectively by reference numerals to perform the methods, processes, and techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for replaying performance of a predictive engine, comprising:
   a processor;
   an engine variant of the predictive engine stored in a digital working memory, wherein the engine variant is determined by an engine parameter set; and
   a non-transitory digital storage medium for storing program code, the program code executable by the processor, the storage medium comprising program code to:
   deploy the engine variant of the predictive engine based on the engine parameter set;
   receive a plurality of queries to the engine variant from an end-user device, wherein each of the plurality of queries contains a timestamp;
   apply a first query segment filter to the plurality of queries to generate a first replay group of queries;
   for each query in the first replay group, the engine variant generates a corresponding predicted result, receives a corresponding actual result, and computes a corresponding prediction score based on the corresponding predicted result and the corresponding actual result;
   group queries in the first replay group into one or more query segments of the first replay group according to the timestamps; and
   generate, as a replay of the performance of the engine variant, an accumulated prediction score over each of the one or more query segments of the first replay group by applying an accumulation function.

2. The system of claim 1, wherein the first query segment filter is selected from the group consisting of an engine variant filter, a user attribute filter, an item attribute filter, and a query attribute filter.

3. The system of claim 1, wherein the accumulation function is a weighted summation.

4. The system of claim 1, wherein each actual result comprises a sequence of user responses corresponding to the queries.

5. The system of claim 1, wherein at least one of the actual results is received from a datastore.

6. The system of claim 1, wherein the first query segment filter is determined manually by an operator.

7. The system of claim 1, wherein the storage medium further comprises program code to:
apply a second query segment filter to the plurality of queries to generate a second replay group of queries;
for each query in the second replay group, the engine variant generates a corresponding predicted result, receives a corresponding actual result, and computes a corresponding prediction score based on the corresponding predicted result and the corresponding actual result;
group queries in the second replay group into one or more query segments of the second replay group according to the timestamps; and
generate, as a replay of the performance of the engine variant, a second accumulated prediction score over each of the one or more query segments of the second replay group by applying the accumulation function.

8. The system of claim 7, wherein the second query segment filter is selected from the group consisting of an engine variant filter, a user attribute filter, an item attribute filter, and a query attribute filter.

9. The system of claim 7, wherein the accumulation function is a weighted summation.

10. The system of claim 1, wherein the replay of the performance of the engine variant comprises a graphical display.

11. A method for replaying performance of a predictive engine, comprising:
deploying an engine variant of the predictive engine based on an engine parameter set;
receiving a plurality of queries to the engine variant from an end-user device, wherein each of the plurality of queries contains a timestamp;
applying a first query segment filter to the plurality of queries to generate a first replay group of queries;
for each query in the first replay group, generating utilizing the engine variant a corresponding predicted result, receiving a corresponding actual result, and computing a corresponding prediction score based on the corresponding predicted result and the corresponding actual result;
grouping queries in the first replay group into one or more query segments of the first replay group according to the timestamps; and
generating, as a replay of the performance of the engine variant, an accumulated prediction score over each of the one or more query segments of the first replay group by applying an accumulation function.

12. The method of claim 11, wherein the first query segment filter is selected from the group consisting of an engine variant filter, a user attribute filter, an item attribute filter, and a query attribute filter.

13. The method of claim 11, wherein the accumulation function a weighted summation.

14. The method of claim 11, wherein each actual result comprises a sequence of user responses corresponding to the queries.

15. The method of claim 11, wherein at least one of the actual results is received from a datastore.

16. The method of claim 11, wherein the first query segment filter is determined manually by an operator.

17. The method of claim 11, further comprising:
applying a second query segment filter to the plurality of queries to generate a second replay group of queries;
for each query in the second replay group, generating utilizing the engine variant a corresponding predicted result, receiving a corresponding actual result, and computing a corresponding prediction score based on the corresponding predicted result and the corresponding actual result;
grouping queries in the second replay group into one or more query segments of the second replay group according to the timestamps; and
generating, as a replay of the performance of the engine variant, a second accumulated prediction score over each of the one or more query segments of the second replay group by applying the accumulation function.

18. The method of claim 17, wherein the second query segment filter is selected from the group consisting of an engine variant filter, a user attribute filter, an item attribute filter, and a query attribute filter.

19. The method of claim 17, wherein the accumulation function is a weighted summation.

20. The method of claim 11, wherein the replay of the performance of the engine variant comprises a graphical display.

21. A non-transitory physical storage medium storing program code, which when executed by a processor, causes the processor to execute a process for replaying performance of a predictive engine, the program code when executed by the processor causes the processor to perform steps to:
deploy an engine variant of the predictive engine based on an engine parameter set;
receive a plurality of queries to the engine variant from an end-user device, wherein each of the plurality of queries contains a timestamp;
apply a first query segment filter to the plurality of queries to generate a first replay group of queries;
for each query in the first replay group, generate utilizing the engine variant a corresponding predicted result, receive a corresponding actual result, and compute a corresponding prediction score based on the corresponding predicted result and the corresponding actual result;
group queries in the first replay group into one or more query segments of the first replay group according to the timestamps; and
generate, as a replay of the performance of the engine variant, an accumulated prediction score over each of the one or more query segments of the first replay group by applying an accumulation function.

22. The non-transitory physical storage medium of claim 21, wherein the first query segment filter is selected from the group consisting of an engine variant filter, a user attribute filter, an item attribute filter, and a query attribute filter.

23. The non-transitory physical storage medium of claim 21, wherein the accumulation function a weighted summation.

24. The non-transitory physical storage medium of claim 21, wherein each actual result comprises a sequence of user responses corresponding to the queries.

25. The non-transitory physical storage medium of claim 21, wherein at least one of the actual results is received from a datastore.

26. The non-transitory physical storage medium of claim 21, wherein the first query segment filter is determined manually by an operator.

27. The non-transitory physical storage medium of claim 21, wherein the program code when executed further causes the processor to perform additional steps to:
- apply a second query segment filter to the plurality of queries to generate a second replay group of queries;
- for each query in the second replay group, generate utilizing the engine variant a corresponding predicted result, receive a corresponding actual result, and compute a corresponding prediction score based on the corresponding predicted result and the corresponding actual result;
- group queries in the second replay group into one or more query segments of the second replay group according to the timestamps; and
- generate, as a replay of the performance of the engine variant, a second accumulated prediction score over each of the one or more query segments of the second replay group by applying the accumulation function.

28. The non-transitory physical storage medium of claim 27, wherein the second query segment filter is selected from the group consisting of an engine variant filter, a user attribute filter, an item attribute filter, and a query attribute filter.

29. The non-transitory physical storage medium of claim 27, wherein the accumulation function is a weighted summation.

30. The non-transitory physical storage medium of claim 21, wherein the replay of the performance of the engine variant comprises a graphical display.

* * * * *